United States Patent
Merritt

(10) Patent No.: US 12,020,173 B1
(45) Date of Patent: *Jun. 25, 2024

(54) SYSTEM AND METHOD FOR MANAGING CUSTOMER CALL-BACKS

(71) Applicant: MASSACHUSETTS MUTUAL LIFE INSURANCE COMPANY, Springfield, MA (US)

(72) Inventor: Sears Merritt, Groton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,890

(22) Filed: Jun. 5, 2023

Related U.S. Application Data

(63) Continuation of application No. 17/226,893, filed on Apr. 9, 2021, now Pat. No. 11,669,749, which is a
(Continued)

(51) Int. Cl.
*H04M 3/523* (2006.01)
*G06N 5/022* (2023.01)
(Continued)

(52) U.S. Cl.
CPC ............ *G06N 5/022* (2013.01); *G06N 20/00* (2019.01); *G06Q 30/0201* (2013.01);
(Continued)

(58) Field of Classification Search
None
See application file for complete search history.

(56) References Cited

U.S. PATENT DOCUMENTS

| 5,519,773 A | 5/1996 | Dumas et al. |
| 6,185,558 B1 | 2/2001 | Bowman et al. |
| (Continued) | | |

FOREIGN PATENT DOCUMENTS

| EP | 2 109 302 B1 | 10/2009 |
| EP | 2 109 302 B2 | 9/2010 |
| (Continued) | | |

OTHER PUBLICATIONS

"Scikit-learn: machine learning in Python", GitHub, retrieved Aug. 27, 2021 from URL: https://github.com/scikit-learn/scikit-learn (5 pages).
(Continued)

*Primary Examiner* — Nafiz E Hoque
(74) *Attorney, Agent, or Firm* — Foley & Lardner LLP

(57) ABSTRACT

A system herein provides automated call-back of customers who have terminated an inbound call by exercising a call-back option of an interactive voice response unit or by abandoning the inbound call, using predictive modeling of caller value to prioritize call-backs. The call management system monitors the inbound customer call and detects any termination of the customer call. A call-back module opens a call-back record for the terminated customer call and associates that call-back record with an identified customer. The call-back module retrieves customer demographic data and other data associated with the identified customer. A predictive module determines a value prediction signal for the identified customer by modeling purchase and lapse behaviors and classifies each identified customer for either priority call-back or subordinate call-back treatment. Priority call-back classification may result in assignment to a priority call-back queue, assignment to a priority call-back queue position, or call-back by a selected agent.

18 Claims, 11 Drawing Sheets

Related U.S. Application Data continuation of application No. 16/806,918, filed on Mar. 2, 2020, now Pat. No. 10,984,330, which is a continuation of application No. 16/378,248, filed on Apr. 8, 2019, now Pat. No. 10,582,060, which is a continuation of application No. 16/111,051, filed on Aug. 23, 2018, now Pat. No. 10,257,355.

(60) Provisional application No. 62/687,130, filed on Jun. 19, 2018, provisional application No. 62/648,325, filed on Mar. 26, 2018, provisional application No. 62/648,330, filed on Mar. 26, 2018, provisional application No. 62/551,690, filed on Aug. 29, 2017.

(51) Int. Cl.
| | |
|---|---|
| *G06N 20/00* | (2019.01) |
| *G06Q 30/0201* | (2023.01) |
| *G06Q 30/0282* | (2023.01) |
| *G06Q 30/0601* | (2023.01) |
| *H04M 3/436* | (2006.01) |
| *H04M 3/42* | (2006.01) |
| *H04M 3/51* | (2006.01) |

(52) U.S. Cl.
CPC ..... *G06Q 30/0282* (2013.01); *G06Q 30/0601* (2013.01); *H04M 3/4365* (2013.01); *H04M 3/5232* (2013.01); *H04M 3/5233* (2013.01); *H04M 3/5235* (2013.01); *H04M 3/42059* (2013.01); *H04M 3/42195* (2013.01); *H04M 3/5183* (2013.01); *H04M 3/5231* (2013.01); *H04M 2203/556* (2013.01); *H04M 2203/558* (2013.01)

(56) References Cited

U.S. PATENT DOCUMENTS

| | | | |
|---|---|---|---|
| 6,236,977 B1 | 5/2001 | Verba et al. | |
| 6,611,590 B1 | 8/2003 | Lu et al. | |
| 6,862,574 B1 | 3/2005 | Srikant et al. | |
| 6,879,683 B1 | 4/2005 | Fain et al. | |
| 6,970,554 B1 | 11/2005 | Peterson et al. | |
| 6,975,720 B1 | 12/2005 | Crook | |
| 7,023,979 B1 | 4/2006 | Wu et al. | |
| 7,035,811 B2 | 4/2006 | Gorenstein | |
| 7,047,206 B1 | 5/2006 | Schultze | |
| 7,228,284 B1 | 6/2007 | Vaillancourt et al. | |
| 7,275,083 B1 | 9/2007 | Seibel et al. | |
| 7,340,410 B1 | 3/2008 | Vaillancourt et al. | |
| 7,580,870 B1 | 8/2009 | Chang | |
| 8,000,989 B1 | 8/2011 | Kiefhaber et al. | |
| 8,155,297 B1 | 4/2012 | Dhir et al. | |
| 8,311,863 B1 | 11/2012 | Kemp | |
| 8,355,934 B2 | 1/2013 | Virdhagriswaran | |
| 8,386,639 B1 | 2/2013 | Galvin | |
| 8,515,736 B1 | 8/2013 | Duta | |
| 8,548,843 B2 | 10/2013 | Folk et al. | |
| 8,571,951 B2 | 10/2013 | Diana et al. | |
| 8,577,014 B2 | 11/2013 | Brandt et al. | |
| 8,582,750 B2 | 11/2013 | Lee et al. | |
| 8,781,092 B2 | 7/2014 | Noble, Jr. | |
| 8,805,734 B2 | 8/2014 | Diana et al. | |
| 8,929,537 B2 | 1/2015 | Chishti et al. | |
| 9,055,148 B2 | 6/2015 | Sri et al. | |
| 9,077,804 B2 | 7/2015 | Kannan et al. | |
| 9,160,851 B2 | 10/2015 | Kugler et al. | |
| 9,263,038 B2 | 2/2016 | Flaks et al. | |
| 9,582,786 B2 | 2/2017 | Gubin et al. | |
| 9,635,181 B1 | 4/2017 | McGann et al. | |
| 9,680,996 B2 | 6/2017 | Kumar et al. | |
| 9,805,734 B2 | 10/2017 | Sugiyama | |
| 9,911,131 B1 | 3/2018 | Ross et al. | |
| 9,916,538 B2 | 3/2018 | Zadeh et al. | |
| 10,229,370 B1 | 3/2019 | Merritt | |
| 10,235,628 B1 | 3/2019 | Merritt | |
| 10,257,355 B1 | 4/2019 | Merritt | |
| 10,257,357 B1 | 4/2019 | Merritt | |
| 10,346,750 B1 | 7/2019 | Merritt | |
| 10,395,184 B1 | 8/2019 | Merritt | |
| 10,402,723 B1 | 9/2019 | Silberman et al. | |
| 10,412,224 B1 | 9/2019 | Merritt | |
| 10,540,593 B1 | 1/2020 | Merritt | |
| 10,547,748 B1 | 1/2020 | Merritt | |
| 10,565,529 B1 | 2/2020 | Merritt | |
| 10,582,060 B1 | 3/2020 | Merritt | |
| 10,769,538 B1 | 9/2020 | Merritt | |
| 10,909,463 B1 | 2/2021 | Merritt | |
| 11,176,461 B1 | 11/2021 | Merritt | |
| 11,551,108 B1 | 1/2023 | Merritt | |
| 2002/0035504 A1 | 3/2002 | Dver et al. | |
| 2002/0082892 A1 | 6/2002 | Raffel et al. | |
| 2002/0128885 A1 | 9/2002 | Evans | |
| 2002/0138492 A1 | 9/2002 | Kil | |
| 2002/0141561 A1* | 10/2002 | Duncan | H04L 51/226 379/220.01 |
| 2004/0081311 A1 | 4/2004 | Thompson | |
| 2004/0143473 A1 | 7/2004 | Tivey et al. | |
| 2004/0143476 A1 | 7/2004 | Kapadia et al. | |
| 2004/0143482 A1 | 7/2004 | Tivey et al. | |
| 2004/0143483 A1 | 7/2004 | Tivey et al. | |
| 2004/0143484 A1 | 7/2004 | Kapadia et al. | |
| 2005/0108064 A1 | 5/2005 | Castleman et al. | |
| 2005/0125334 A1 | 6/2005 | Masella et al. | |
| 2005/0135593 A1* | 6/2005 | Becerra | H04M 3/5166 379/201.01 |
| 2005/0195966 A1 | 9/2005 | Adar et al. | |
| 2006/0041500 A1 | 2/2006 | Diana et al. | |
| 2006/0155642 A1 | 7/2006 | Pettersen | |
| 2006/0200360 A1 | 9/2006 | Razletovskiy | |
| 2006/0229896 A1 | 10/2006 | Rosen et al. | |
| 2006/0265259 A1 | 11/2006 | Diana et al. | |
| 2007/0027746 A1 | 2/2007 | Grabowich | |
| 2007/0136164 A1 | 6/2007 | Roti et al. | |
| 2007/0174108 A1 | 7/2007 | Monster | |
| 2008/0120129 A1 | 5/2008 | Seubert et al. | |
| 2008/0162258 A1 | 7/2008 | Kala et al. | |
| 2008/0184270 A1 | 7/2008 | Cole et al. | |
| 2008/0201204 A1 | 8/2008 | Rose et al. | |
| 2008/0201205 A1 | 8/2008 | Rose et al. | |
| 2008/0294501 A1 | 11/2008 | Rennich | |
| 2009/0190744 A1 | 7/2009 | Xie et al. | |
| 2009/0190745 A1 | 7/2009 | Xie et al. | |
| 2009/0190749 A1 | 7/2009 | Xie et al. | |
| 2009/0190750 A1 | 7/2009 | Xie et al. | |
| 2009/0232294 A1 | 9/2009 | Xie et al. | |
| 2009/0234710 A1 | 9/2009 | Belgaied Hassine et al. | |
| 2010/0030578 A1 | 2/2010 | Siddique et al. | |
| 2010/0054453 A1 | 3/2010 | Stewart | |
| 2010/0114573 A1 | 5/2010 | Huang et al. | |
| 2010/0306249 A1 | 12/2010 | Hill et al. | |
| 2011/0153449 A1 | 6/2011 | Hite | |
| 2011/0196776 A1 | 8/2011 | Rash et al. | |
| 2011/0225082 A1 | 9/2011 | Diana et al. | |
| 2011/0258016 A1 | 10/2011 | Barak et al. | |
| 2011/0258067 A1 | 10/2011 | Rowell | |
| 2011/0307257 A1 | 12/2011 | Pereg et al. | |
| 2012/0053986 A1 | 3/2012 | Cardno et al. | |
| 2012/0066065 A1 | 3/2012 | Switzer | |
| 2012/0072232 A1 | 3/2012 | Frankham et al. | |
| 2012/0166445 A1 | 6/2012 | Chakrabarti et al. | |
| 2012/0203584 A1 | 8/2012 | Mishor et al. | |
| 2013/0006916 A1 | 1/2013 | McBride et al. | |
| 2013/0031081 A1 | 1/2013 | Vijayaraghavan et al. | |
| 2013/0054480 A1 | 2/2013 | Ross et al. | |
| 2013/0080362 A1 | 3/2013 | Chang et al. | |
| 2013/0085805 A1 | 4/2013 | Krusar | |
| 2013/0215116 A1 | 8/2013 | Siddique et al. | |
| 2013/0218634 A1 | 8/2013 | Hills et al. | |
| 2013/0236002 A1 | 9/2013 | Jennings et al. | |
| 2013/0332204 A1 | 12/2013 | Fiori et al. | |
| 2014/0025871 A1 | 1/2014 | Kanai | |
| 2014/0058831 A1 | 2/2014 | Duva et al. | |

(56) References Cited

U.S. PATENT DOCUMENTS

| | | |
|---|---|---|
| 2014/0149178 A1 | 5/2014 | Hedges |
| 2014/0149339 A1 | 5/2014 | Title et al. |
| 2014/0153703 A1 | 6/2014 | Desai et al. |
| 2014/0180974 A1 | 6/2014 | Kennel et al. |
| 2014/0201126 A1 | 7/2014 | Zadeh et al. |
| 2014/0229406 A1 | 8/2014 | Puzis et al. |
| 2014/0249872 A1 | 9/2014 | Stephan et al. |
| 2014/0257871 A1 | 9/2014 | Christensen et al. |
| 2014/0279722 A1 | 9/2014 | Singh et al. |
| 2014/0289005 A1 | 9/2014 | Laing et al. |
| 2014/0324529 A1 | 10/2014 | Bliss |
| 2015/0046219 A1 | 2/2015 | Shavlik |
| 2015/0154524 A1 | 6/2015 | Borodow et al. |
| 2015/0189088 A1 | 7/2015 | Surridge et al. |
| 2016/0036976 A1 | 2/2016 | Odinak et al. |
| 2016/0065735 A1 | 3/2016 | Pott et al. |
| 2016/0071117 A1 | 3/2016 | Duncan |
| 2016/0132892 A1 | 5/2016 | Zhou et al. |
| 2016/0203498 A1 | 7/2016 | Das et al. |
| 2016/0261742 A1 | 9/2016 | Offen et al. |
| 2016/0300252 A1 | 10/2016 | Frank et al. |
| 2016/0337795 A1 | 11/2016 | Nachman et al. |
| 2016/0352900 A1 | 12/2016 | Bell et al. |
| 2017/0124581 A1 | 5/2017 | Wilson et al. |
| 2017/0140313 A1 | 5/2017 | Nandi et al. |
| 2017/0140387 A1 | 5/2017 | Nandi et al. |
| 2017/0186018 A1 | 6/2017 | Nandi et al. |
| 2017/0214797 A1* | 7/2017 | Dhir .................. H04M 3/5231 |
| 2017/0223190 A1 | 8/2017 | Mandel et al. |
| 2017/0243137 A1 | 8/2017 | Mandel et al. |
| 2019/0034963 A1 | 1/2019 | George et al. |
| 2019/0095785 A1 | 3/2019 | Sarkar et al. |
| 2020/0013068 A1 | 1/2020 | Pony et al. |

FOREIGN PATENT DOCUMENTS

| | | |
|---|---|---|
| WO | WO-2007/112411 A2 | 10/2007 |
| WO | WO-2009/065052 A1 | 5/2009 |

OTHER PUBLICATIONS

Bernier, "Interactive Voice Response", Genesys, retrieved Oct. 3, 2017 from URL: http://www.genesys.com/solutions/customer-engagement/inbound/intelligent-voice-response (3 pages).

Bernier, "Speech & Text Analytics", Genesys, retrieved Oct. 3, 2017 from URL: http://genesis.com/solutions/employee-engagement/workforce-optimization/workforce-planning/speech-text-analytics (4 pages).

Cody et al., "The integration of business intelligence and knowledge management", IBM Systems Journal, vol. 41, No. 4, Jul. 12, 2002, pp. 697-713, retrieved from URL: https://pdfs.semanticscholar.org/3803/109409dd7822c6007d5c76808b8c28698e2cd.pdf (17 pages).

Costa, Sara, "Call Flow", Talkdesk Support, Jan. 18, 2018, retrieved May 11, 2018 from URL: https://support.talkdesk.com/hc/en-us/articles/206196766-Call-Flow (6 pages).

Final Office Action on U.S. Appl. No. 16/525,268 dated Jul. 21, 2022 (106 pages).

Florez-Lopez et al., "Marketing Segmentation Through Machine Learning Models: An Approach Based on Customer Relationship Management and Customer Profitability Accounting", Social Science Computer Review, Oct. 8, 2008, pp. 1-22, DOI: 10.1177/0894439308321592, retrieved from URL: https://pdfs.semanticscholar.org/ef05/502e936a94cafa0037c764bfb2212f385d97.pdf (22 pages).

Gayle, Sanford, "The Marriage of Market Basket Analysis to Predictive Modeling", 2000, pp. 1-6, retrieved from URL: http://ai.stanford.edu/~ronnyk/WEBKDD2000/papers/gayle.pdf (6 pages).

Golbeck, Jennifer Ann, "Computing and applying trust in web-based social networks", Dissertation, 2005 (199 pages).

Guestrin, Carlos, "Unsupervised learning or Clustering-K-means Gaussian mixture models", Apr. 4, 2007, retrieved from URL: http://www.cs.cmu.edu/-guestrin/Class/10701-S07/Slides/clustering.pdf (67 pages).

Information Disclosure Statement filed Feb. 14, 2019.

Jutla et al., "Enabling and Measuring Electronic Customer Relationship Management Readiness," Proceedings of the 34th Hawaii International Conference on System Sciences—2001; <http://www.computer.org/csdl/proceedings/nicss/2001 /0981 /07 /09817023.pdf>, Aug. 7, 2002, (10 pages).

Kim et al., "Customer Targeting: A Neural Network Approach Guided by Genetic Algorithms", Feb. 1, 2005, retrieved from URL: http://citeseerx.ist.psu.edu/viewdoc/download?doi=10.1.1.2.697&rep=rep1 &type=pdf (31 pages).

Lin et al., "Combining ranking concept and social network analysis to detect collusive groups in online auctions", Expert Systems with Applications, vol. 30, Issue 10, pp. 9079-9086 (8 pages).

Motta et al., "Forecasting in multi-skill call centers: A multi-agent multi-service (MAMS) approach: research in progress", 2013 Fifth International Conference on Service Science and Innovation {ICSSI), Oct. 24, 2013, retrieved from URL: http://ieeexplore.ieee.org/abstract/document/6599389/ (7 pages).

Non-Final Office Action on U.S. Appl. No. 17/226,893 Dtd Sep. 22, 2022.

Non-Final Office Action on U.S. Appl. No. 16/525,268 dated Jan. 17, 2023 (96 pages).

Notice of Allowance on U.S. Appl. No. 17/521,752 Dtd Aug. 23, 2022.

Notice of Allowance on U.S. Appl. No. 17/991,800 dated Apr. 19, 2023 (8 pages).

Notice of Allowance on U.S. Appl. No. 17/226,893 dated Jan. 19, 2023 (6 pages).

Python Home Page, retrieved Aug. 27, 2021 from URL: https://www.python.org/ (3 pages).

Shen et al., Forecasting Time Series of Inhomogenous Poisson Processes with Application to Call Center Workforce Management, The Annals of Applied Statistics, <https://www.unc.edu/-haipeng/publication/poissonSVD.pdf>, Jul. 25, 2008, (25 pages).

Stepanov et al., "Automatic Summarization of Call-center Conversations", Conference: IEEE Automatic Speech Recognition and Understanding Workshop (ASRU 2015), Dec. 2015, retrieved from URL: https://www.researchgate.net/publication/282976793_Automatic_Summarization_of_Call-center_Conversations (3 pages).

U.S. Non-Final Office Action for U.S. Appl. No. 16/525,268 dated Dec. 1, 2021 (64 pages).

U.S. Non-Final Office Action on U.S. Appl. No. 16/110,872 dated Oct. 2, 2018 (7 pages).

U.S. Non-Final Office Action on U.S. Appl. No. 16/110,940 dated Oct. 4, 2018 (7 pages).

U.S. Non-Final Office Action on U.S. Appl. No. 16/111,011 dated Oct. 2, 2018 (7 pages).

U.S. Non-Final Office Action on U.S. Appl. No. 16/267,331 dated Mar. 7, 2019 (7 pages).

U.S. Non-Final Office Action on U.S. Appl. No. 16/276,165 dated Mar. 27, 2019 (8 pages).

U.S. Non-Final Office Action on U.S. Appl. No. 16/283,378 dated Mar. 27, 2019 (9 pages).

U.S. Non-Final Office Action on U.S. Appl. No. 16/378,248 dated Oct. 3, 2019 (7 pages).

U.S. Non-Final Office Action on U.S. Appl. No. 16/455,983 dated Aug. 8, 2019 (7 pages).

U.S. Non-Final Office Action on U.S. Appl. No. 16/541,046 dated Sep. 5, 2019 (7 pages).

U.S. Non-Final Office Action on U.S. Appl. No. 16/739,967 dated Mar. 13, 2020 (8 pages).

U.S. Non-Final Office Action on U.S. Appl. No. 16/773,805 dated Mar. 26, 2020 (8 pages).

U.S. Non-Final Office Action on U.S. Appl. No. 16/791,750 dated May 13, 2020 (8 pages).

U.S. Non-Final Office Action on U.S. Appl. No. 16/806,918 dated Oct. 5, 2020 (7 pages).

U.S. Non-Final Office Action on U.S. Appl. No. 17/013,312 dated Oct. 2, 2020 (9 pages).

U.S. Non-Final Office Action on U.S. Appl. No. 16/546,052 dated Sep. 17, 2019 (7 pages).

U.S. Notice of Allowance on U.S. Appl. No. 16/110,940 dated Dec. 12, 2018 (7 pages).

(56) References Cited

OTHER PUBLICATIONS

U.S. Notice of Allowance on U.S. Appl. No. 16/110,872 dated Oct. 31, 2018 (7 pages).
U.S. Notice of Allowance on U.S. Appl. No. 16/110,940 dated Dec. 31, 2018 (4 pages).
U.S. Notice of Allowance on U.S. Appl. No. 16/111,011 dated Oct. 2, 2018 (7 pages).
U.S. Notice of Allowance on U.S. Appl. No. 16/111,051 dated Dec. 19, 2018 (9 pages).
U.S. Notice of Allowance on U.S. Appl. No. 16/267,331 dated Mar. 25, 2019 (5 pages).
U.S. Notice of Allowance on U.S. Appl. No. 16/276,165 dated Jul. 18, 2019 (4 pages).
U.S. Notice of Allowance on U.S. Appl. No. 16/276,165 dated May 14, 2019 (5 pages).
U.S. Notice of Allowance on U.S. Appl. No. 16/283,378 dated May 10, 2019 (5 pages).
U.S. Notice of Allowance on U.S. Appl. No. 16/378,248 dated Oct. 30, 2019 (5 pages).
U.S. Notice of Allowance on U.S. Appl. No. 16/455,983 dated Oct. 18, 2019 (4 pages).
U.S. Notice of Allowance on U.S. Appl. No. 16/455,983 dated Oct. 8, 2019 (4 pages).
U.S. Notice of Allowance on U.S. Appl. No. 16/455,983 dated Sep. 9, 2019 (5 pages).
U.S. Notice of Allowance on U.S. Appl. No. 16/541,046 dated Oct. 3, 2019 (5 pages).
U.S. Notice of Allowance on U.S. Appl. No. 16/546,052 dated Oct. 21, 2019 (5 pages).
U.S. Notice of Allowance on U.S. Appl. No. 16/739,967 dated May 11, 2020 (5 pages).
U.S. Notice of Allowance on U.S. Appl. No. 16/773,805 dated Sep. 30, 2020 (5 pages).
U.S. Notice of Allowance on U.S. Appl. No. 16/791,750 dated Aug. 7, 2020 (5 pages).
U.S. Notice of Allowance on U.S. Appl. No. 16/806,918 dated Dec. 23, 2020 (5 pages).
U.S. Notice of Allowance on U.S. Appl. No. 17/013,312 dated Jan. 11, 2021 (5 pages).
U.S. Notice of Allowance on U.S. Appl. No. 17/107,571 dated Jul. 13, 2021 (10 pages).
Wang et al., "Recommending trusted online auction sellers using social network analysis." Expert Systems with Applications 34.3, 2008, pp. 1666-1679 (14 pages).
Yang et al., "A Method for Web Service Discovery and Dynamic Composition Based on Service Chain", Germany, Springer Verlag, 2012, (2 pages).
Yankov et al., "Evaluation of Explore-Exploit Policies in Multi-result Ranking Systems", Apr. 28, 2015, retrieved from URL: https://arxiv.org/pdf/1504.07662.pdf (9 pages).
Barga, R., Fontama, V., Tok, W. H., & Cabrera-Cordon, L. (2015). Predictive analytics with Microsoft Azure machine learning (pp. 221-241). Berkely, CA: Apress. (Year: 2015).

* cited by examiner

FIG. 8
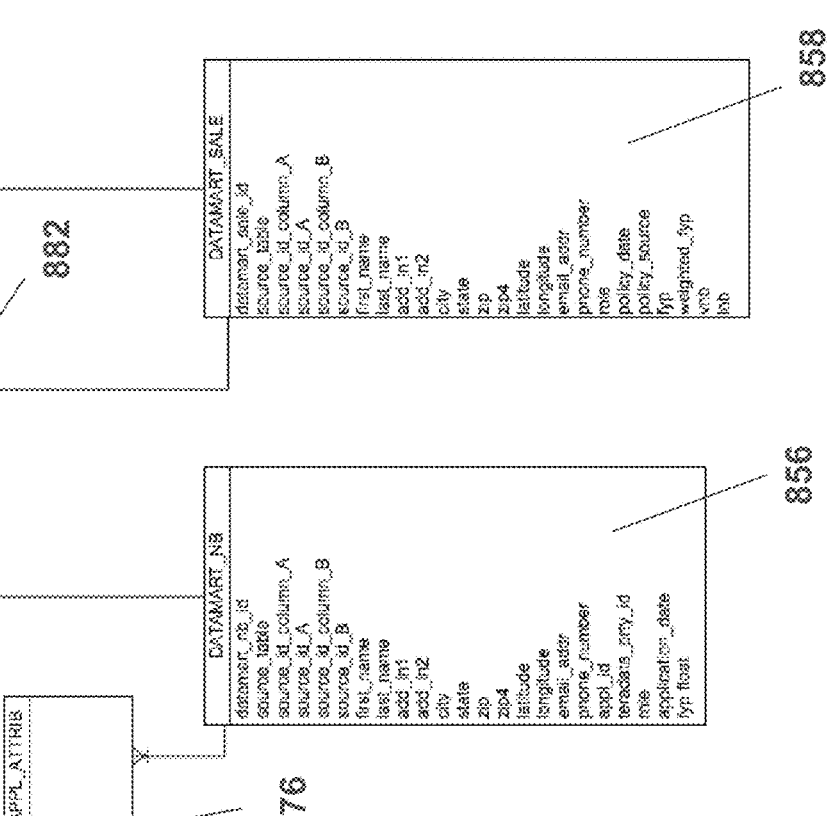
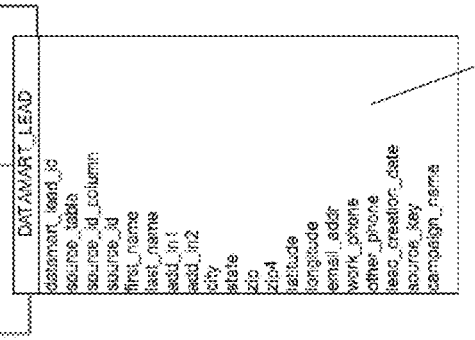
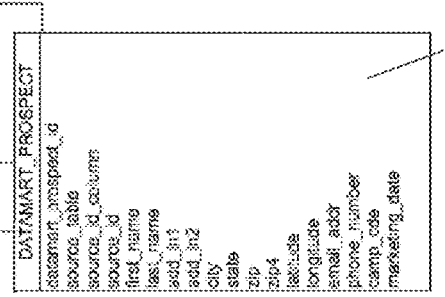

SYSTEM AND METHOD FOR MANAGING CUSTOMER CALL-BACKS

CROSS-REFERENCE TO RELATED APPLICATIONS

This application is also a continuation of U.S. patent application Ser. No. 17/226,893, filed Apr. 9, 2021, which is a continuation of U.S. patent application Ser. No. 16/806,918, filed Mar. 2, 2020, which is a continuation of U.S. patent application Ser. No. 16/378,248, filed Apr. 8, 2019, which is a continuation of U.S. patent application Ser. No. 16/111,051, filed Aug. 23, 2018, which claims the benefit of U.S. Provisional App. No. 62/551,690, filed Aug. 29, 2017, claims the benefit of U.S. Provisional App. No. 62/648,330, filed Mar. 26, 2018, claims the benefit of U.S. Provisional App. No. 62/648,325, filed Mar. 26, 2018, and claims the benefit of U.S. Provisional App. No. 62/687,130, filed Jun. 19, 2018, all of which are incorporated by reference in their entirety.

TECHNICAL FIELD

The present disclosure relates generally to customer contact centers and their operation, and more particularly to a system and method for managing agent call-backs to contact center customers.

BACKGROUND

Customer contact centers provide an important interface for customers/partners of an organization to contact the organization. The contact can be for a request for a product or service, for trouble reporting, service request, etc. The contact mechanism in a conventional call center is via a telephone, but it could be via a number of other electronic channels, including e-mail, online chat, etc.

The contact center consists of a number of human agents, each assigned to a telecommunication device, such as a phone or a computer for conducting email or Internet chat sessions, which is connected to a central switch. Using these devices, the agents generally provide sales, customer service, or technical support to the customers or prospective customers of a contact center, or of a contact center's clients. Conventionally, a contact center operation includes a switch system that connects callers to agents. In an inbound contact center, these switches route inbound callers to a particular agent in a contact center, or, if multiple contact centers are deployed, to a particular contact center for further routing. When a call is received at a contact center (which can be physically distributed, e.g., the agents may or may not be in a single physical location), if a call is not answered immediately, the switch will typically place the caller on hold and then route the caller to the next agent that becomes available. This is sometimes referred to as placing the caller in a call queue.

Being placed on hold for more than a few seconds can be an unpleasant and frustrating experience for many people. As a consequence, a significant number of inbound callers who are put on hold for more than a brief time up abandon their calls and hang up. In some cases, depending on the call center's communication system, before abandoning the call the caller may leave a message requesting a call-back. Many call centers maintain call-back systems to returned abandoned calls, and such systems often place such callers in a queue for call-back by a call center agent. In conventional methods of agent call-backs to abandoned callers, high business value callers may not receive a call-back for an extended period of time, while the low business value calls often receive call-backs more promptly, possibly causing additional dissatisfaction on the part of the high business value caller.

There is a need for a system and method for identifying high business value inbound callers at a call center that have left a message requesting a call-back. There is a related need for a system and method for identifying high business value inbound callers at a call center as to those inbound callers that have abandoned an inbound call. Additionally, there is a need to improve traditional methods of arranging call-backs to inbound callers who have abandoned a call to improve allocation of limited call center resources to high business value callers.

SUMMARY

Embodiments described herein can automatically call back a customer following termination of the customer's inbound call based on predicted value of the call-back. The present systems and methods include call-back of customers that have terminated a customer call by exercising a call-back option of an interactive voice response unit during the inbound call, as well as customers that have abandoned the inbound call. By identifying high value customers for prioritized or personalized call-back, the present methods improve allocation of limited call center resources and can improve customer satisfaction of high business value inbound callers.

In a first step of a processor-based method, upon receiving a customer call from an inbound caller, the processor opens an inbound call record and automatically includes in that call record any automatic number identifier information included with the customer call.

In an embodiment, the call management system monitors the customer call and a call evaluation module automatically collects call related information and updates the inbound call record with this call related information. In an embodiment, the inbound caller interacts with an interactive voice response unit, and the call evaluation module collects IVR data provided by the inbound caller. In an embodiment, the call management system monitors an inbound call queue including the inbound caller, and the call evaluation module collects related inbound queue data.

In various embodiments, the call evaluation module analyzes one or more of the IVR data and the inbound queue data to detect any termination of the customer call. In one embodiment, the call evaluation module detects termination of the customer call by the inbound caller's exercising a call-back option of the interactive voice response unit. In another embodiment, the call evaluation module detects the inbound caller's abandonment of the customer call by monitoring the inbound caller's interactions with the IVR and presence in the inbound queue.

In various embodiments, upon detecting termination of the inbound call, a call-back module opens a call-back record for the terminated customer call and includes in that call-back record information from the inbound call record, including, e.g., any automatic number identifier information included with the customer call. The call-back module queries one or more database, including databases of the enterprise and external databases, to retrieve customer identifier data. In an embodiment, the customer identifier data comprise two or more of name of the identified customer, address of the identified customer, and zip code of the identified customer. The call-back module associates the call-back record with an identified customer via the customer identifier data, and then retrieves customer demographic data associated with the identified customer.

In various embodiments, the call-back module determines a value prediction signal for the identified customer via a predictive module includes a logistic regression module operating in conjunction with a tree-based module. The value prediction signal includes one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product.

Based on the value prediction signal determined, the call-back module classifies the identified customer into a first call-back group or a second call-back group. In various embodiments, an identified customer classified in the first call-back group is assigned a priority call-back queue assignment while an identified customer classified in the second call-back group is assigned a subordinate call-back queue assignment. An automatic calling device of the call center calls back the identified customer based on priority call-back queue assignment or subordinate call-back queue assignment for that customer.

In another embodiment, in the event the call-back module classifies the identified customer in the first call-back group, the automatic calling device calls back the identified customer for connection to an agent of the call center who is selected based on one or more of the customer identifier data and the customer demographic data. In the event the call-back module classifies the identified customer in the second call-back group, the automatic calling device calls back the identified customer via a subordinate call-back procedure.

In an embodiment, a processor based method for managing customer calls within a call center comprises, upon receiving a customer call at a call center of an enterprise from an inbound caller, opening, by the processor, an inbound call record for the inbound caller including any automatic number identifier information delivered with the customer call; monitoring, by the processor, the customer call of the inbound caller to retrieve one or more of IVR data received from the inbound caller via interaction with an interactive voice response unit, and inbound queue data retrieved by monitoring an inbound call queue including the inbound caller, and updating the inbound call record for the inbound caller with the one or more of the IVR data and the inbound queue data retrieved; analyzing, by the processor, the one or more of the IVR data and the inbound queue data to detect any termination of the inbound call by exercising a call-back option of the interactive voice response unit or by abandoning the customer call, and in the event of detecting the termination of the customer call: opening, by the processor, a call-back record for the terminated customer call including any automatic number identifier information and delivered the one or more of the IVR data and the inbound queue data from the inbound call record; querying, by the processor, one or more database to retrieve customer identifier data and associating the call-back record with an identified customer via the customer identifier data; retrieving, by the processor, customer demographic data associated with the identified customer; determining, by a predictive model executing on the processor, a value prediction signal comprising one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product; wherein the predictive model comprises a logistic regression model operating in conjunction with a tree based model; classifying, by the predictive model executing on the processor based on the value prediction signal determined by the predictive model, the identified customer into one of a first value group and a second value group; in the event the classifying step classifies the identified customer into the first value group, assigning, by the processor, the identified customer to a priority call-back queue assignment; wherein the priority call-back queue assignment comprises one or more of a queue position in a priority call-back queue, and a priority queue position in a call-back queue; in the event the classifying step classifies the identified customer into the second value group, assigning, by the processor, the identified customer to a subordinate call-back queue assignment; wherein the subordinate call-back queue assignment comprises one or more of a queue position in a subordinate call-back queue, and a subordinate queue position in a call-back queue; and automatically calling back the identified customer, by an automatic calling device in communication with the processor, based on the priority call-back queue assignment or the subordinate call-back queue assignment for the identified customer.

In an embodiment, a processor based method for managing customer calls within a call center comprises, upon receiving a customer call at a call center of an enterprise from an inbound caller, opening, by the processor, an inbound call record for the inbound caller, the inbound call record including any automatic number identifier information delivered with the customer call; monitoring, by the processor, the customer call to detect any termination of the customer call by exercising a call-back option of the interactive voice response unit or by abandoning the customer call, and in the event of detecting the termination of the customer call: opening, by the processor, a call-back record for the terminated customer call including any automatic number identifier information delivered; querying, by the processor, one or more database to retrieve customer identifier data and associating the call-back record with an identified customer via the customer identifier data; retrieving, by the processor, customer demographic data associated with the identified customer; determining, by a predictive model executing on the processor, a value prediction signal comprising one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product; wherein the predictive model comprises a logistic regression model operating in conjunction with a tree based model; classifying, by the predictive model executing on the processor based on the value prediction signal determined by the predictive model, the identified customer into one of a first value group and a second value group; in the event the classifying step classifies the identified customer into the first value group, automatically calling back the identified customer, via an automatic calling device in communication with the processor, for connection to a selected agent of the call center; in the event the classifying step classifies the identified customer into the second value group, automatically executing a subordinate call-back procedure via an automatic calling device in communication with the processor.

In an embodiment, a system for managing customer calls within a call center comprises an inbound telephone call receiving device for receiving a customer call from an inbound caller to the call center; a telephone calling device for placing outbound customer calls from the call center; an interactive voice response unit; non-transitory machine-readable memory that stores call history information and customer profile information for customers of the call center; a predictive modeling module that stores a predictive model of customer value, wherein the predictive model comprises a logistic regression model operating in conjunction with a tree based model; and a processor, configured to execute a call-back management module, wherein the processor in communication with the non-transitory machine-readable memory and the predictive modeling module executes a set of instructions instructing the processor to: generate a customer call customer call record including any automatic number identifier information delivered with the customer call received by the inbound telephone call receiving device; monitor the customer call to detect any termination of the customer call by exercising a call-back option of the interactive voice response unit or by abandoning the customer call, and in the event of detecting the termination of the customer call: opening a call-back record for the terminated customer call including any automatic number identifier information delivered; query one or more database to retrieve customer identifier data, and associate the call-back record with an identified customer via the customer identifier data; retrieve from the non-transitory machine-readable memory any of the call history information and the customer profile information associated with the identified customer; determine a value prediction signal comprising one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product; classify the identified customer into one of a first value group and a second value group based on the value prediction signal; and direct the telephone calling device for placing outbound customer calls: in the event the call-back management module classifies the identified customer into the first value group, to automatically call back the identified customer for connection to a selected agent of the call center; in the event the call-back management module classifies the identified customer into the second value group, to automatically execute a subordinate call-back procedure.

Other objects, features, and advantages of the present disclosure will become apparent with reference to the drawings and detailed description of the illustrative embodiments that follow.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 8 is a schematic diagram of customer database event tables for customer group prospects, lead, new business, and sale, and of tables for attribution between events, in accordance with an embodiment.

DETAILED DESCRIPTION

Figure 1:
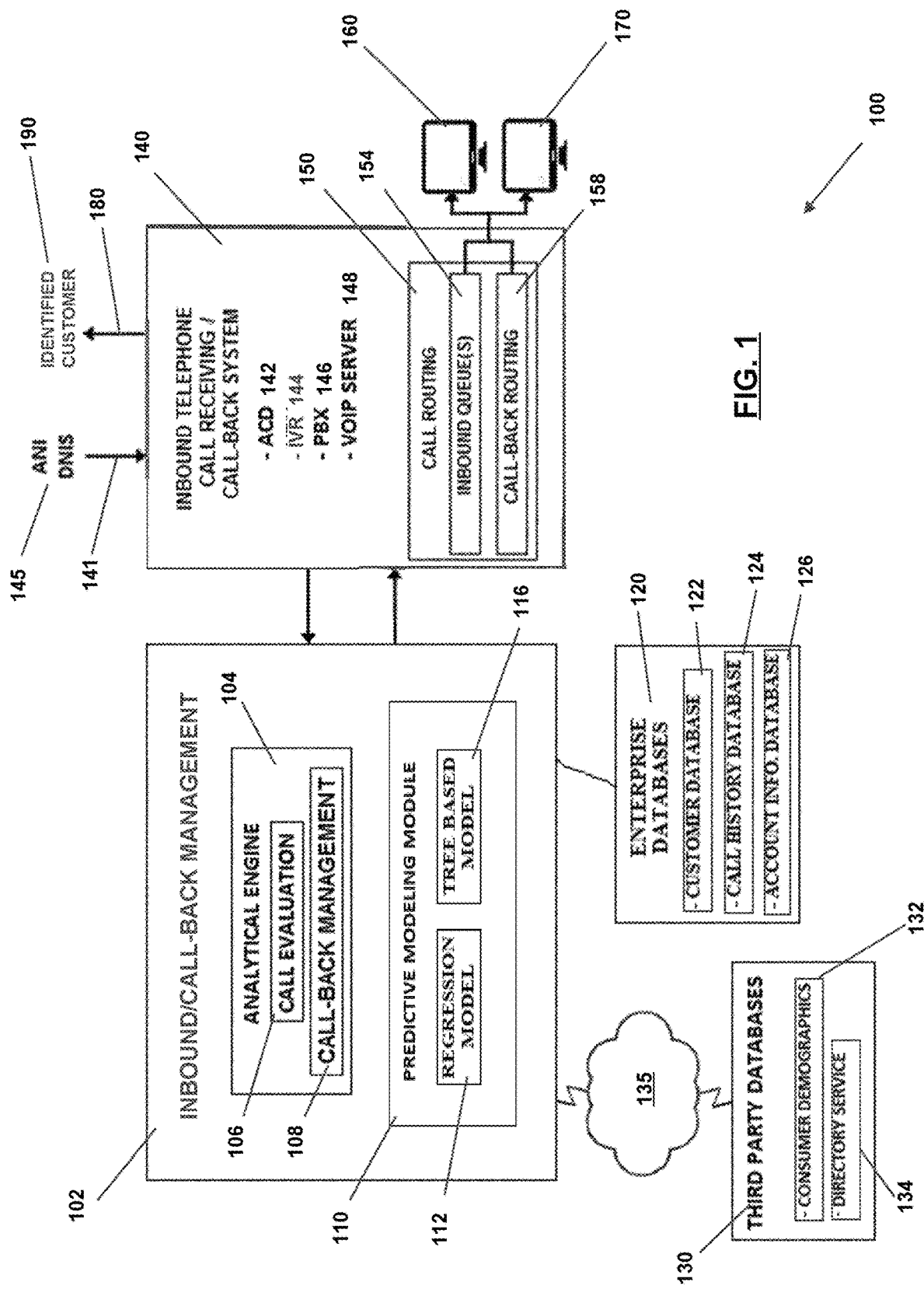
FIG. 1 is a system architecture for a customer management system of a contact center, in accordance with an embodiment of the invention.

In the following detailed description, reference is made to the accompanying drawings, which depict non-limiting, illustrative embodiments of the present disclosure. Other embodiments may be utilized and logical variations, e.g., structural and/or mechanical, may be implemented without departing from the scope of the present disclosure. To avoid unnecessary detail, certain information, items, or details known to those skilled in the art may be omitted from the following.

Contact routing at an inbound contact center can be structured in numerous ways. An individual employed by the contact center to interact with callers is referred to in the present disclosure as an "agent." Contact routing can be structured to connect callers to agents that have been idle for the longest period of time. In another example of routing an inbound call, if there are eight agents at a contact center, and seven are occupied with callers, the switch will generally route the inbound caller to the one agent that is available. If all eight agents are occupied with contacts, the switch will typically put the caller on hold and then route the caller to the next agent that becomes available. More generally, the contact center will set up a queue of inbound callers and preferentially route the longest-waiting callers to the agents that become available over time. A pattern of routing callers to either the first available agent or the longest-waiting agent is sometimes referred to as "round-robin" caller routing.

In general, when a caller is placed in a call queue, the caller's queue position is dependent upon the receipt time of the call at the vendor location. No consideration is given to the identity of the caller or the potential value of the call. As a result, the high business value call is subjected to a long wait, with attendant dissatisfaction on the part of the high business value caller. When call centers have an inadequate number of skilled agents to handle all callers, such as at times of peak call volume, challenges of effectively handling high-value callers can be especially severe.

To combat a related problem—call abandonment due to delays in call center agents answering and handling calls in the first place—many call centers have in recent years implemented automatic call-back systems. For example, in some conventional automatic call-back systems, when an incoming call is not answered by an agent within a predetermined period of time (e.g., three rings), a call-back system automatically answers the call and plays a prerecorded announcement to the caller giving him or her the option of either having the call placed in a queue to wait for an agent to pick it up, or hanging up and being called back when an agent becomes available. If the caller selects the call-back option, the system either obtains the caller's telephone number automatically from the telephone network, e.g., by means of Automatic Number Identification (ANI) or Dialed Number Identification Service (DNIS), or requests the number from the caller. The caller then hangs up. When an agent becomes available, the system uses the caller's number to automatically place a new call to the caller and connects the call to the available agent. In another scenario, a caller may be placed on hold by an agent after the call has been connected to the agent and handling of the call by the agent has commenced. Unfortunately, conventional automatic call-back systems do not distinguish high business value callers that have abandoned a call after being placed on hold, possibly causing significant dissatisfaction on the part of the high business value caller.

Embodiments described herein can automatically call back a customer following termination of the customer call based on predicted value of the call-back. The present systems and methods include call-back of customers who have terminated a customer call by exercising a call-back option of an interactive voice response unit during the inbound call, as well as customers that have abandoned the inbound call. By identifying high value customers for prioritized or personalized call-back, the present methods can improve allocation of limited call center resources and improve customer satisfaction of high business value inbound callers.

In a first step of a processor-based method, upon receiving a customer call from an inbound caller on an inbound telephone call receiving device of the call center, the processor opens an inbound call record and automatically includes in that call record any automatic number identifier information included with the customer call. In various embodiments, the automatic number identifier information included with the customer call includes Automatic Number Identification (ANI) or Dialed Number Identification Service (DNIS).

In an embodiment, the call management system monitors the customer call and a call evaluation module automatically collects call related information and updates the inbound call record with this call related information. In an embodiment, the inbound caller interacts with an interactive voice response (IVR) unit, and the call evaluation module collects IVR data provided by the inbound caller. In various embodiments, the IVR data includes voice signals and Touch Tone signal, such dual-tone multi-frequency signaling (DTMF) signals, received from the inbound caller. In an embodiment, the call center offers a call-back option via the IVR unit, in which inbound callers who are on hold while waiting for live connection to an agent of the call center can elect to request a call-back from an agent of the call center. In this event, the IVR data can include an indication that the inbound caller has exercised the call-back option, and related IVR data such as a call-back number provided by the inbound caller.

In an embodiment, the call management system monitors an inbound call queue including the inbound caller, and the call evaluation module collects related inbound queue data. In various embodiments, inbound queue data includes statistical data such as the elapsed time of the inbound caller spent in the queue, and a queue identifier for the queue including the inbound caller, among different queue identifiers of a plurality of call queues maintained by the call center. In addition, the call management system monitors the inbound caller's continuing presence, and thereby detects whether the inbound caller has abandoned the call.

In various embodiments, the call evaluation module analyzes one or more of the IVR data and the inbound queue data to detect any termination of the customer call. In one embodiment, the call evaluation module detects termination of the customer call by the inbound caller's exercising a call-back option of the interactive voice response unit. In another embodiment, the call evaluation module detects the inbound caller's abandonment of the customer call via monitoring the inbound caller's presence in an inbound queue.

In various embodiments, upon detecting termination of the inbound call, a call-back module opens a call-back record for the terminated customer call and includes in that call-back record call related information from the inbound call record, including, e.g., the automatic number identifier information, IVR data, and inbound queue data. The call-back module queries one or more database, including databases of the enterprise and external databases, to retrieve customer identifier data. In an embodiment, the customer identifier data comprise two or more of name of the identified customer, address of the identified customer, and zip code of the identified customer.

The call-back module associates the call-back record with an identified customer via the customer identifier data, and then retrieves customer demographic data associated with the identified customer. To retrieve the customer demographic data, the call-back module may query one or more database such as an internal customer profile database of the enterprise, or an external customer demographic database.

In various embodiments, the call-back module determines a value prediction signal for the identified customer, via a predictive module including a logistic regression module operating in conjunction with a tree-based module. The value prediction signal includes one or more of a first signal representative of a likelihood that the identified customer will accept an offer to purchase a product, a second signal representative of a likelihood that the identified customer will lapse in payments for a purchased product, and a third signal representative of a likelihood that the identified customer will accept an offer to purchase the product and will not lapse in payments for the purchased product. In an embodiment, the logistic regression model employs 11 regularization. In an embodiment, the logistic regression model employs 12 regularization. In an embodiment, the tree based model is a random forests ensemble learning method for classification.

Based on the value prediction signal determined, the call-back module classifies the identified customer into a first call-back group or a second call-back group. In various embodiments, an identified customer classified in the first call-back group is assigned a priority call-back queue assignment while an identified customer classified in the second call-back group is assigned a subordinate call-back queue assignment. An automatic calling device of the call center calls back the identified customer based on priority call-back queue assignment or subordinate call-back queue assignment for that customer.

In an embodiment, the first value group includes customers having a first set of modeled values, and the second value group includes customers having a second set of modeled values, wherein modeled values in the first set of modeled values are higher than modeled values in the second set of modeled values. In an embodiment, the modeled values are modeled lifetime values. In an embodiment, when the predictive model classifies the identified customer into the first value group having higher modeled values, the call management system assigns the identified customer to a priority call-back queue assignment; when the predictive model classifies the identified customer into the second value group having lower modeled values, the call management system assigns the identified customer to a subordinate call-back queue assignment.

As used in the present disclosure, a priority call-back queue assignment and subordinate call-back queue assignment are relative terms, in which a priority call-back queue assignment is more favorable than a subordinate call-back queue assignment. In an embodiment, the priority call-back queue assignment is a queue position in a priority call-back queue, and the subordinate call-back queue assignment is a queue position in a subordinate call-back queue. In an embodiment, the priority call-back queue is a queue for immediate call-back, and the subordinate call-back queue is a queue for deferred call-back. In an embodiment, the priority call-back queue is a queue for call-back by higher-skill agents, and the subordinate call-back queue is a queue for call-back by lower-skill agents. In another embodiment, the priority queue assignment is a more advanced position within a given call-back queue than a subordinate queue call-back assignment.

In another embodiment, in the event the call-back module classifies the identified customer in the first call-back group, the automatic calling device calls back the identified customer for connection to an agent of the call center who is selected based on one or more of the customer identifier data and the customer demographic data. In the event the call-back module classifies the identified customer in the second call-back group, the automatic calling device calls back the identified customer via a subordinate call-back procedure.

In an embodiment, the selection of the agent of the call center includes matching the customer identifier data to private call-back data associated with the selected agent. In another embodiment, the call-back module retrieves retrieving internal call history data of the call center for the identified customer, and the selection of the agent of the call center includes identifying the selected agent from the customer identifier data and the internal call history data for the identified customer.

In an embodiment, in the event the call-back module classifies the identified customer in the second call-back group, the subordinate call-back procedure consists of automatically calling back with a recorded message of the interactive voice response unit. In an embodiment, the subordinate call-back procedure consists of automatically calling back for connection to an agent from a pool of unskilled agents. In an embodiment, the subordinate call-back procedure consists of automatically deferring call-back to the identified customer in the second call-back group.

In various embodiments, a customer database tracks individuals who are customers of a sponsoring organization or client of the call center, or other enterprise served by the call center, associating these individuals with one or more groups representing general types of customers. In an embodiment, these customer groups include prospects, leads, new business, and purchasers (also herein called sales). The customer database joins these four groups to better evaluate marketing activities and customer service activities of the call center. Data from the customer database is used in building stronger predictive models used for prioritizing call-backs of terminated customer calls. In the present disclosure, customer database data is sometimes called "enterprise customer data," denoting data relating to customers of the sponsoring enterprise. Enterprise customer data retrieved for an identified customer is used in selecting a suitable predictive model from a plurality of predictive models, based upon consistency of the selected predictive model as a modeling target with the set of enterprise customer data for the identified customer. Enterprise customer data is associated with one or more enterprise customer record identifying a given customer tracked by the customer data. Enterprise customer data includes data identified with one or more customer groups (also herein called customer event data), activity event data, and attributions data, among other types of data.

Methods and systems described herein can employ a pre-sale predictive model relating to offer for sale of one or more product offered or supplied by a sponsoring organization of an inbound contact center, in valuing identified customers for automatic call-back. In various embodiments, the products offered or supplied by a sponsoring organization require payments by the customer for a period following closing the sale, such as premiums to maintain in force an insurance policy or other financial product, or installment plans for product purchase. In various embodiments, the pre-sale predictive model incorporates information on a minimum period of time of customer payments required to achieve a beneficial transaction for the sponsoring organization, wherein failure of the customer to make payments over at least this minimum time period is sometimes referred to herein as "lapse." The presale predictive model forecasts customer behavior to improve the probability of closing a sale of an offered product to an inbound customer, and to reduce the probability that the customer will lapse in payment for the purchased product.

The predictive model can classify inbound callers into two or more groups. In an embodiment, two value groups are modeled to model higher predicted value and lower predicted value, respectively, to the sponsoring organization. In various embodiments, this classification governs value-based prioritization of terminated customer calls for automated call-back, to allocate limited resources of the inbound contact center. An individual employed by the contact center to interact with callers is referred to herein as an "agent."

The inbound contact center is sometimes called simply a contact center or a call center. The individuals that interact with the contact center using a telecommunication device are referred to herein as callers, and alternatively are referred to as inbound callers, as customers, or as identified customers. As used the present disclosure, a "customer" may be an existing customer or a prospective customer of the sponsoring organization, including any of the general groups of customer tracked in the customer database. In an embodiment, a customer is associated with the one or more of the groups: prospects, leads, new business, and sales (also herein called purchasers). A given individual may be associated with multiple such groups over different stages of customer acquisition. For example, a purchaser may have previously been one or more of a prospect, a lead, or a new business applicant.

In an embodiment of the customer groups in the customer database, "prospects" are individuals that have contacted the enterprise. Inbound prospects may or may not be customers in the customer databases. In an embodiment, if an inbound caller is not identified with an individual in the customer database, the database opens a new record for that caller in the prospects group. "Leads" are individuals who have expressed interest in one or more products of the enterprise; as used herein products may include goods or services sold by the enterprise, or a combination of these. A lead may have previously been a prospect, or may not have been a prospect (e.g., an individual that searches for products or services of the enterprise online). "New Business" (also herein called new business applicants) identifies applicants to purchase one or more product of the enterprise, where such purchase requires underwriting. These applicants may have been prospects, leads, or both. "Purchasers" (also herein called "sales") generally are individuals that own a product of the enterprise. Purchasers may have been prospects, leads, new business applicants, or any combination of these groups.

A pre-sale prediction model can incorporate information on a minimum period of time of customer payments required to achieve a beneficial transaction for the sponsoring organization and use this information in determining conditions for "lapse." In an embodiment, pre-sale predictive models of the present disclosure incorporate a pre-determined period of time of payments following the sale of the product to define lapse. In certain embodiments, a sale of an insurance policy or other financial product requires only that the prospect complete an application to purchase the policy, sometimes called guaranteed acceptance. When selling via guaranteed acceptance, lapse rates for sold policies tend to be higher.

A key metric for value-based classification of a customer who has purchased a product is called a "lifetime value" of the product sale to that customer. In various embodiment, lifetime value includes the sum of all associated costs over product lifetime, netted against revenue for the product sale. The lifetime value for the product (insurance policy) sold to that customer is the net value of all premiums paid, over the sum of all such associated costs during that policy life.

In an illustrative embodiment involving sale of an insurance policy, associated costs over product lifetime include various sales acquisition costs, including marketing costs distributed across inbound calls, cost of operating the inbound contact center distributed across inbound calls, and commission at the time of sale. In this example, additional associated costs include cost of providing the insurance policy, and claims or death benefit. In various embodiments, total costs for a customer are modeled based on the customer's age, gender, policy face amount, and whether the policy is lapsed, and by applying formulas based on amortization of total marketing costs and operations costs. In an illustrative embodiment involving sale of an insurance policy, total revenue for a customer is modeled based on the customer's age, gender, policy face amount, and whether the policy is lapsed (if so, when). The model calculates expected total premium payments based on age and gender via lookup of mortality statistics.

Methods and systems described herein can identify lapse (e.g., for a given product or class of products) with a pre-determined period of time following sale of the product, and define lapse as failure of the customer to make payments for the product over at least this period of time. In various embodiments, this predetermined period of time is based upon modeling a minimum period of time for achieving a positive lifetime value for the product sale. This model compares total payments received with associated costs over different product lifetimes to determine the predetermined period. In one embodiment, product lifetime represents a period of time over in which the customer has continued to make purchase payments for the product, such as premiums or installment payments. In another embodiment, lifetime value is measured during the full term or life of an insurance policy or other financial instrument until all claims and death benefits have been paid, even if all premiums or other customer payments had been paid prior to this time.

FIG. 1 shows a system architecture for a customer management system 100 of a contact center, also herein called a call center, according to an illustrative embodiment. Customer management system 100 includes an inbound/call-back queue management system 102, also called an inbound/call-back management system. The inbound/call-back management system 102 may be hosted on one or more computers (or servers), and the one or more computers may include or be communicatively coupled to one or more databases. Inbound/call-back management system 102 manages assignment of terminated inbound telephone calls for call-back by agents based on predicted value of the potential call-back.

Inbound/call-back management system 102 includes an analytical engine 104 containing a call evaluation sub-module 106 and a call-back management sub-module 108. Call evaluation sub-module 106 opens an inbound call record (also herein referred to as a call record) for each inbound caller, and automatically collects call related information and updates the inbound call record with call related information during pendency of the inbound call. In an embodiment, the inbound caller interacts with an interactive voice response unit (IVR), and the call evaluation module 106 collects IVR data 144 provided by the inbound caller during this interaction. In an embodiment, the call management system monitors an inbound call queue 154 including the inbound caller, and the call evaluation module 106 collects inbound queue data from this monitoring. Call-back management sub-module 108 tracks data related to identified customers of the call center associated with terminated inbound calls, following termination of the inbound calls. Call-back management sub-module 108 acquires and analyzes information concerning the terminated callers to prioritize call-backs to identified customers based on predictive modeling of customer value.

Inbound/call-back management system 102 further includes a predictive modeling module 110 including a regression model 112 and a tree based model 116. The analytical engine 104 with sub-modules 106 and 108, and the predictive modeling module 110 with predictive models 112, 116, may be executed by a processor of the inbound/call-back management system 102.

Inbound/call-back management system 102 is interfaced with one or more enterprise databases 120, which are internal databases of the inbound contact center. Internal databases include customer database 122, which tracks individuals who are customers of the sponsoring organization of the call center or other client enterprise. Other internal databases include call history database 124 and account information database 126. In an embodiment, analytical engine 104 interacts with external services, applications, and databases, such as third party databases 130, through one or more application programmable interfaces, an RSS feed, or some other structured format, via communication network 135. In the embodiment of FIG. 1, inbound/call-back management system 102 retrieves data from one or more third party databases 130, including a consumer demographic database 132 and a directory service database 134.

Predictive modeling module 110 models behaviors of terminated inbound callers following identification of these callers as identified customers in order to prioritize call-backs to the identified customers. Modeled behaviors include likelihood that an identified customer receiving a call-back will purchase a product offered by the call center, and likelihood that the identified customer will lapse in payments for a purchased product. The predictive modeling module analyzes each identified customer using data associated with a customer identifier for the terminated inbound caller. This customer identifier may be based on data obtained from various sources such as call related data on inbound callers collected by the call evaluation sub-module 106, and data retrieved by the call-back management module 108 from enterprise databases 120 (e.g., customer database 122) and third party databases 130 (e.g., directory service database 134). Input data used in predictive modeling also may include data derived from the retrieved data that has been transformed by analytical engine 104 in order to facilitate predictive modeling, as described herein.

Databases 120 are organized collections of data, stored in non-transitory machine-readable storage. In an embodiment, the databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating, and/or administration of databases. The databases may conform to a well-known structural representational model, such as relational databases, object-oriented databases, and network databases. Illustrative database management systems include MySQL, PostgreSQL, SQLite, Microsoft SQL Server, Microsoft Access, Oracle, SAP, dBASE, FoxPro, IBM DB2, LibreOffice Base, and FileMaker Pro.

Analytical engine 104 can be executed by a server, one or more server computers, authorized client computing devices, smartphones, desktop computers, laptop computers, tablet computers, PDAs and other types of processor-controlled devices that receive, process, and/or transmit digital data. Analytical engine 104 can be implemented using a single-processor system including one processor, or a multi-processor system including any number of suitable processors that may be employed to provide for parallel and/or sequential execution of one or more portions of the techniques described herein. Analytical engine 104 performs these operations as a result of central processing unit executing software instructions contained within a computer-readable medium, such as within memory. In one embodiment, the software instructions of the system are read into memory associated with the analytical engine 104 from another memory location, such as from storage device, or from another computing device via communication interface. In this embodiment, the software instructions contained within memory instruct the analytical engine 104 to perform processes described below. Alternatively, hardwired circuitry may be used in place of or in combination with software instructions to implement the processes described herein. Thus, implementations described herein are not limited to any specific combinations of hardware circuitry and software.

Inbound/call-back management system 102 interfaces with an inbound telephone call receiving system and an outbound calling (customer call-back) system 140. System 140 is also herein called call receiving/outbound calling system, and is sometimes referred to by its component devices, e.g., an inbound telephone call receiving device and an outbound calling device. In customer management system 100, inbound/call-back management system 102 and call receiving/outbound calling system 140 may be integrated in a single computing platform. Alternatively, these systems may be based on separate computing platforms. In certain embodiments, the computing platform(s) are interfaced with computer-telephone integration ("CTI") middleware such as CT Connect® of Enghouse Interactive Inc. or the Telephony Application Programming Interface (TAPI) of Microsoft Corporation. In an embodiment, an inbound telephone call receiving device of the call receiving/outbound calling system 140 includes a telephony device that accepts inbound telephone calls through a telephony interface 141, such as conventional T1 or fiber interfaces. In an embodiment, the inbound telephone call receiving device obtains caller information associated with the inbound calls, such as Automatic Number Identification ("ANI") and Dialed Number Identification Service (DNIS) information 145. ANI is a signaling system feature in which a series of digits, either analog or digital, are included in the call identifying the source telephone number of the calling device. DNIS is a telephone function that sends the dialed telephone number to an answering service. The DNIS need not be a telephone number associated with any physical location. Call receiving/outbound calling system 140 also includes an outbound calling device (e.g., telephone calling device) for placing call-backs 180 to identified customers 190.

Call receiving/outbound calling system 140 may include an Automatic Call Distributor (ACD) system 142; an Interactive Voice Response unit (IVR) 144; a private branch exchange (PBX) switch 146; a Voice over Internet Protocol (VOIP) server 148; or any combination of such devices. In an embodiment, intrasite telephony access within the call center may be managed by a private branch exchange (PBX) switch 146. In an embodiment, PBX switch 146 operates in coordination with ACD 142 to distribute inbound calls and to distribute customer call-backs to customer service stations of locally networked call center agents. In further embodiments, inbound customer inquiries may include e-mail or instant messages that provide inquiry information based on login ID, e-mail address, IP or instant message address. In such an embodiment, the call center can gather additional information by an automated e-mail or instant message survey response, which can be used to request various types of customer identifier data.

In an embodiment, Interactive Voice Response unit (IVR) 144 collects customer identifier data, such as name, address, and zip code, through automated interaction with the customer. In an embodiment, the customer management system 100 communicates with a third party directory service 134, which can provide additional customer identifier data, such as name and address information, for callers that are initially identified only by a telephone number.

Callers may interact with agents 160, 170 of the call center by live connection to an agent from an inbound queue 154, or by call-back from an agent via call-back routing module 158. In an embodiment, agents are associated with a sponsoring organization that sells or supplies products with the assistance of the call center. In an embodiment, the organization generates sales of one or more product through advertisements that give a phone number to prospective customers, and the prospective customers call into the call center using this phone number. In an embodiment, a sponsoring organization for the call center is an insurance company or other financial services company, and the agents may include insurance agents. In some cases, an insurance agent may be associated with only a single insurance provider (sometimes referred to as a "captive" insurance agent). In other cases, an "independent" insurance agent may be associated with several different insurance providers. Agent sales performance may be measured by aggregate sales productivity metrics, as well as distributed performance metrics such as sales metrics by product types, etc.

Predictive modeling module 110 generates a value prediction signal representative of one or more of the following customer behaviors: (a) likelihood that the customer will accept an offer to purchase a product, (b) likelihood that the customer will lapse in payments for a purchased product, and (c) likelihood that the customer will accept an offer to purchase the product and will not lapse in payments for the purchased product. In certain embodiments, the predictive modeling module can predict more than one of these customer behaviors. For example, the predictive model may first determine the customer behavior (a) likelihood that the customer will accept an offer to purchase a product, followed by determining the customer behavior (b) likelihood that the customer will lapse in payments for a purchased product, in order to determine a value prediction signal. Based on this value prediction signal, the analytical module, in conjunction with the predictive modeling module, classifies each customer call into one of two, or more, value groups.

Depending on the value group determined for each customer call, analytical engine 104 prioritizes a call-back to the identified customer associated with a terminated customer call via call-back routing module 158. Value-based classification of call-backs by call management system 100 represents a significant improvement over traditional methods of routing callers, such as "round-robin" caller routing.

Figure 2:
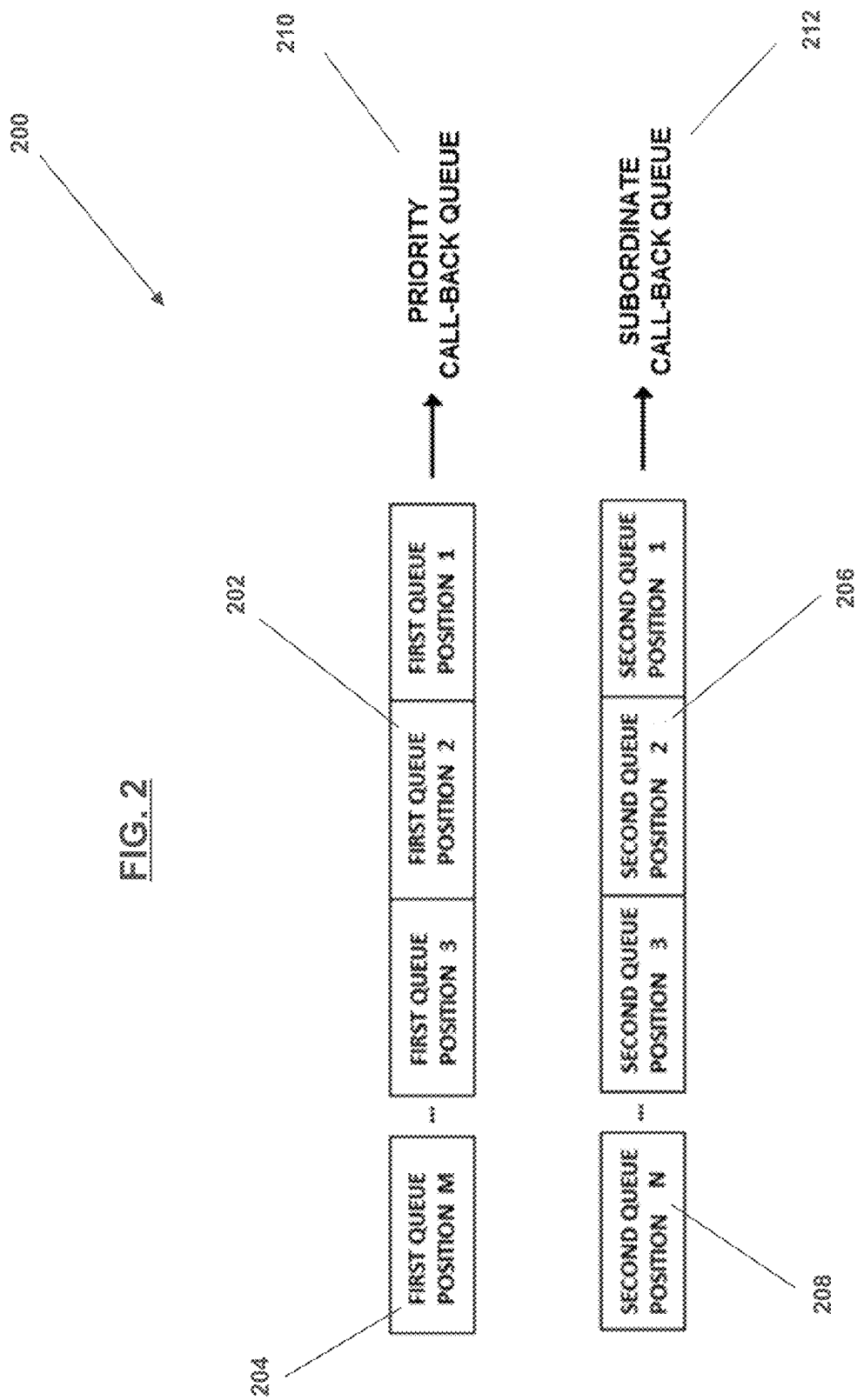
FIG. 2 illustrates a queue arrangement for call-backs to customers by agents of a call center, in accordance with an embodiment.

In various embodiments, call-back routing module 158 assigns each terminated caller either to a priority call-back queue assignment or to a subordinate call-back queue assignment. The priority call-back queue assignment comprises one or more of a queue position in a priority call-back queue, and a priority queue position in a call-back queue. The subordinate call-back queue assignment comprises one or more of a queue position in a subordinate call-back queue, and a subordinate queue position in a call-back queue. FIG. 2 illustrates a call-back queue arrangement 200 in which a terminated caller within a first value classification (e.g., including higher-value customers) is assigned to a priority call-back queue 210, while a terminated caller with a second value classification (e.g., including lower-value customers) is assigned to a subordinate call-back queue 212. In an embodiment, priority call-back queue 210 is a queue for immediate call-back, and subordinate call-back queue 212 is a queue for deferred call-back. In an embodiment, priority call-back queue 210 is a queue for call-backs by higher-skill agents, and subordinate call-back queue 212 is a queue for call-backs by lower-skill agents. In another embodiment, agents in priority call-back queue 210 are dedicated to customer call-backs, while agents in subordinate call-back queue 212 normally handle inbound calls but may call back customers in special circumstances such as periods of low call volume (sometimes called a blended queue).

Figure 3:
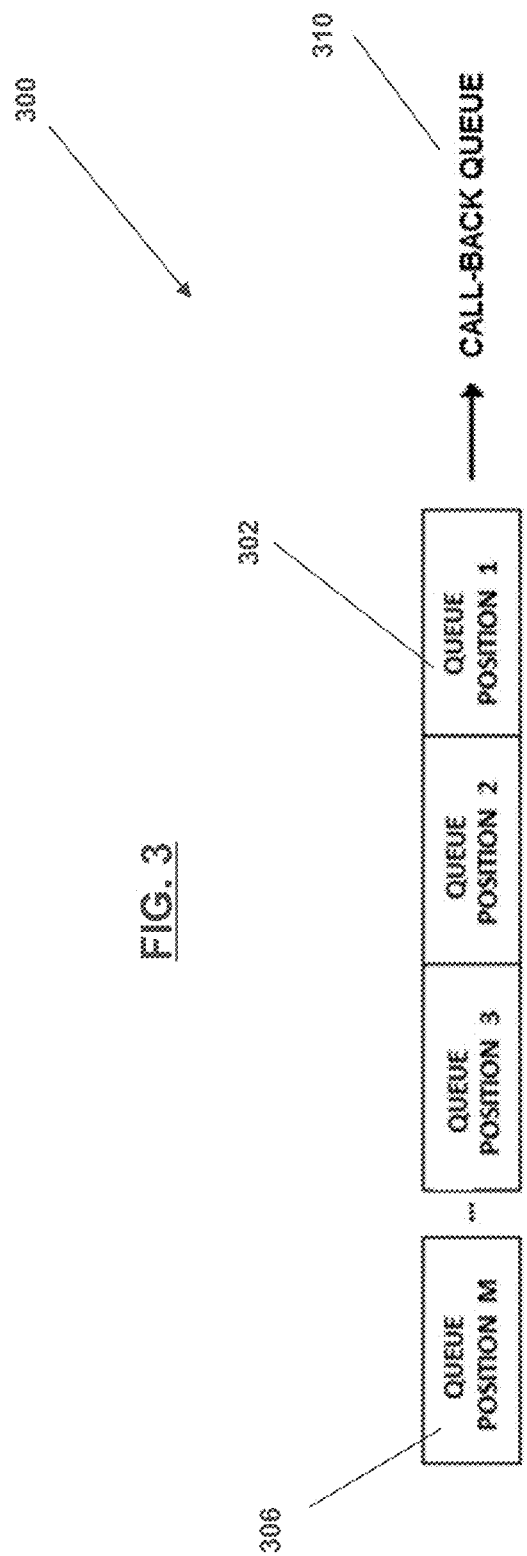
FIG. 3 illustrates a queue arrangement for call-backs to customers by agents of a call center, in accordance with an embodiment.

FIG. 3 illustrates a call-back queue arrangement 300 in which a terminated caller that has received a priority call-back queue assignment is assigned to a priority call-back queue position in call-back queue 310 (e.g., a queue position at or near the first queue position 302), while a terminated caller that has received a subordinate call-back queue assignment is assigned to a subordinate call-back queue position in call-back queue 310 (e.g., a queue position at or near the last queue position 306). In certain embodiments, the call-back queue arrangements of FIGS. 2, 3 can be combined, e.g., call-back queue positions 204, 206, 208, 210 of multiple queues can be assigned based upon value-based classification of terminated callers.

In various embodiments, call-back routing module 158 assigns each identified customer either to a first value group or a second value group to control automatically call-back to each terminated caller. In an embodiment, the call receiving/call-back system 140 automatically calls back 180 each identified customer 190 classified in the first value group, for connection to an agent of the call center who is selected, e.g., based on one or more of the customer identifier data and the customer demographic data. In an embodiment, the agent may be selected based on the agent's own entry of the identified customer in an enterprise database 120 of the call center, indicating that a call-back to that customer should be from the agent in question (sometimes called a private call back arrangement). The call receiving/call-back system 140 automatically executes a subordinate call-back procedure to automatically call back 180 each identified customer 190 classified in the second value group. In various embodiments, the subordinate call-back queue procedure comprises one or more of: automatically calling back with a recorded message of the interactive voice response unit; automatically calling back for connection to an agent from a pool of unskilled agents; and automatically deferring call-back to the identified customer in the second value group.

Figure 4:
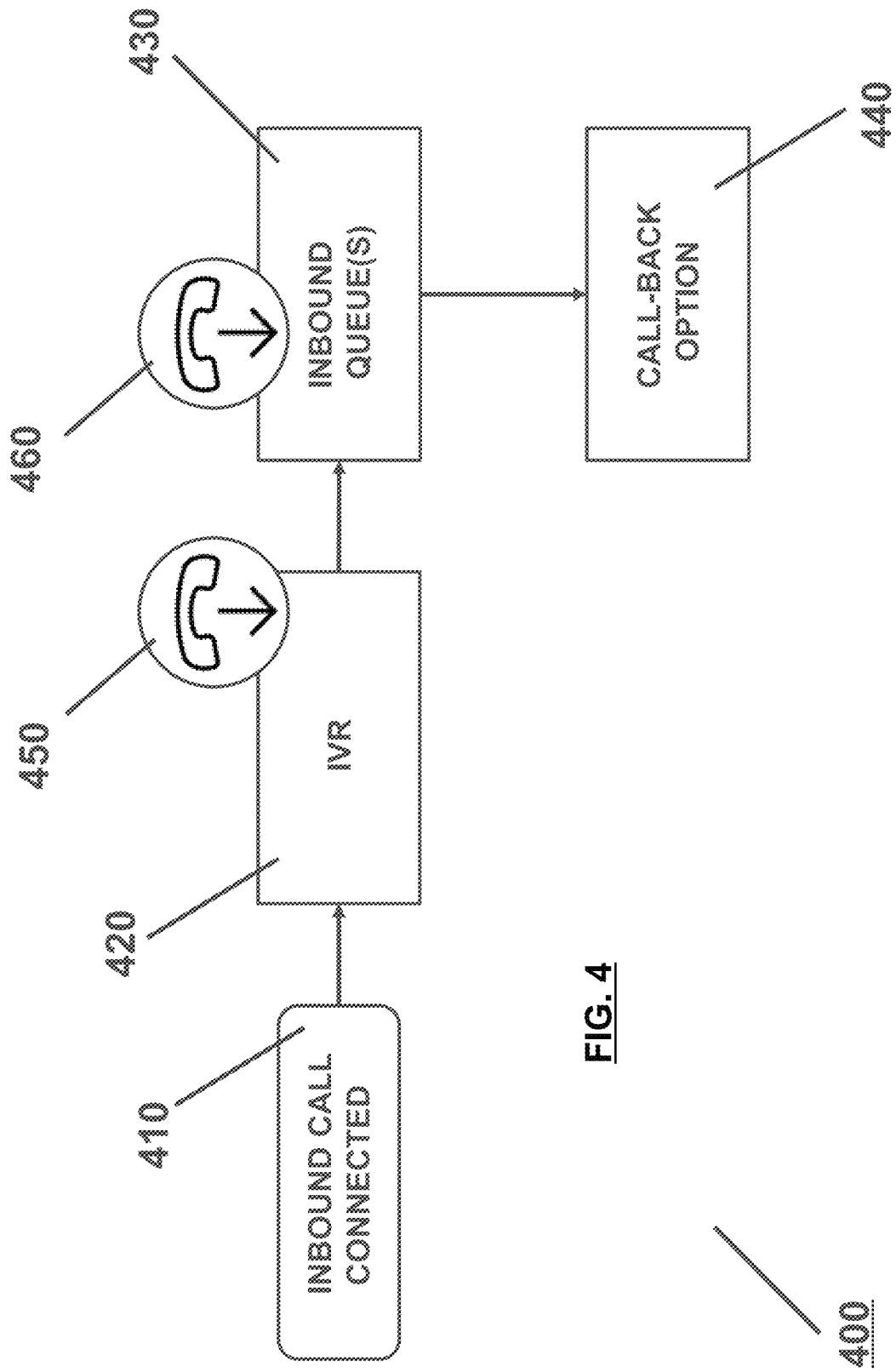
FIG. 4 illustrates a method for managing an inbound customer call, in accordance with an embodiment.

FIG. 4 illustrates a method for routing an inbound customer call, illustrating various examples of termination of the customer call. At 410, the inbound customer call is connected to call receiving/call-back system 400. At this stage, the inbound telephone call receiving system automatically collects any automatic number identifier information, such as Automatic Number Identification (ANI) or Dialed Number Identification Service (DNIS) information included with the customer call. The call evaluation module 106 opens a call record for the inbound call, this call record including any automatic number identifier information collected and other call related information received from the inbound caller during the call.

At an initial stage of the inbound call, the call receiving method 400 may automatically interact with the inbound caller at IVR stage 420. While connected to the IVR, the caller may be presented with a number of options regarding the purpose of the call. The caller may press a button on his touch-tone telephone or provide a voice response that may be decoded during the IVR stage 420. The responses provided through the IVR may also be included in the call record stored by call evaluation module 106 for that call. For instance, IVR stage 420 may query an inbound caller to collect customer identifier information when ANI or DNIS are not operative, e.g., when caller-ID is blocked.

At stage 430, the inbound caller is placed on hold in an inbound queue 154 for live connection to an agent. In an embodiment, the inbound queue is selected from multiple queues 154 of the call center. In an embodiment, the call receiving method monitors an inbound call queue 430 including the inbound caller, and the call evaluation module 106 collects related inbound queue data. For example, inbound queue data can include continuing presence of the inbound caller in the inbound queue, elapsed time spent by the caller in the inbound queue, and an identifier of the inbound queue among multiple queues of the call center.

In various embodiments, the call receiving method analyzes one or more of the IVR data 420 and inbound queue data 430 to detect any termination of the customer call. In one embodiment, the call evaluation module detects termination of the customer call by the inbound caller's exercising a call-back option 440 of the interactive voice response unit. In exercising the call-back option, before terminating the inbound call the caller may leave a voicemail message and/or may otherwise interact with the IVR unit to provide information such as a desired call-back number, preferred time for call-back, etc.

In another embodiment, the call evaluation module detects the inbound caller's abandonment of the customer call by monitoring the inbound caller's interaction with the IVR 220 or by monitoring the inbound caller's presence in the inbound queue 230. An abandoned call is one in which the customer did not reach an agent because the customer disconnected the call while in the IVR other than by exercising a call-back option (e.g., as shown at 250), or because the customer disconnected the call while on hold in the inbound queue (e.g., as shown at 260). In an embodiment, if the caller is routed to voicemail from the inbound queue via call-option option 240 without being presented to an agent, and the caller hangs up without leaving a voicemail or other call-back instructions, the call is considered abandoned.

Figure 5:
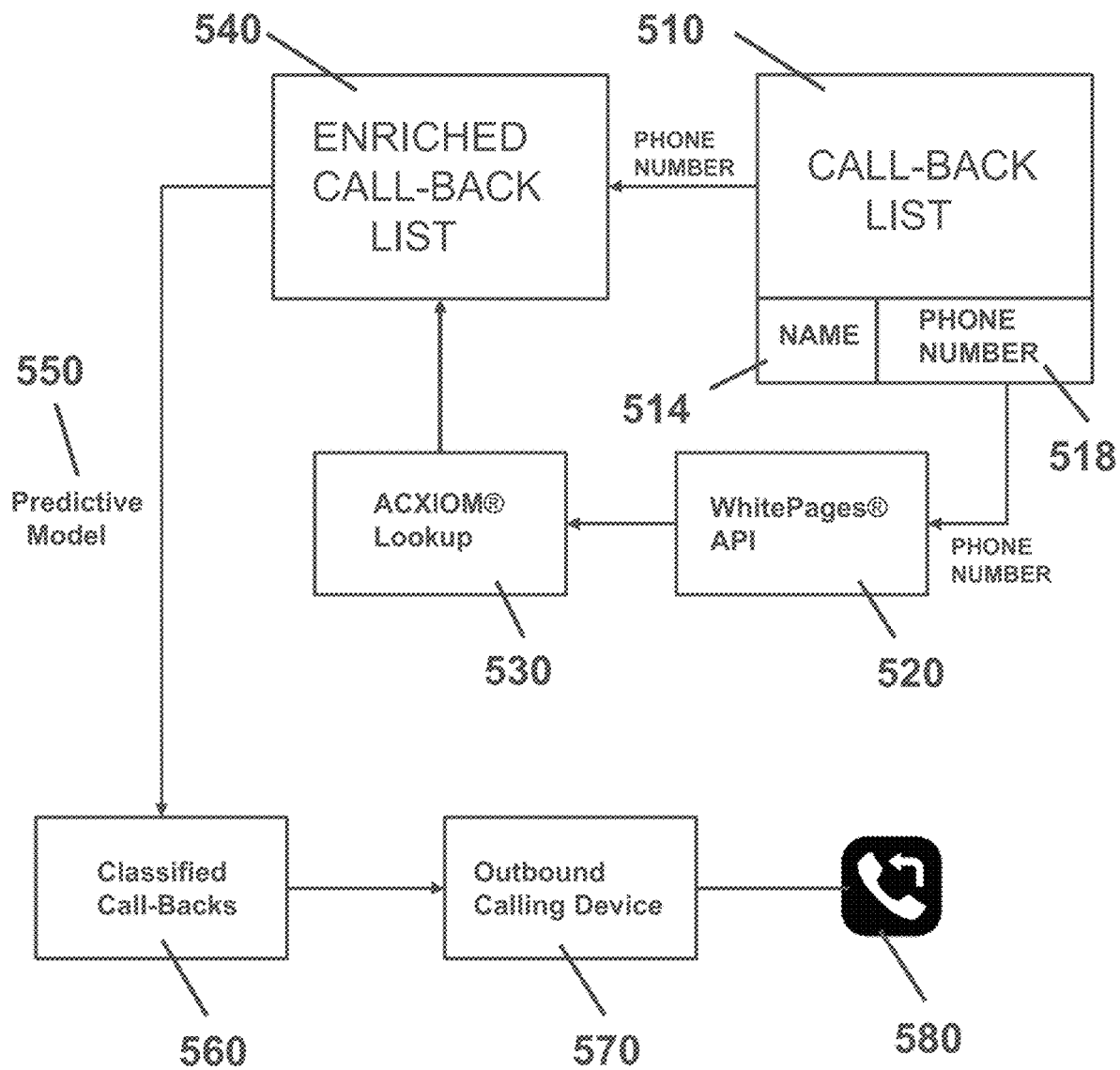
FIG. 5 illustrates a call-back management method in accordance with an embodiment.

FIG. 5 illustrates a call-back management method 500, which may be executed by the call-back management module 108 of FIG. 1. A call-back list module 510 receives a phone number 518, and optionally other data such as a name 514, for a terminated inbound call, and opens a call-back record corresponding to the terminated call. In an embodiment, call-back list module 510 receives call record data stored by the call evaluation module 106 for the terminated inbound call. The call back list module 510 sends the call-back record, including at a minimum phone number 518 of the customer call, to enriched call-back list module 540. The phone number may be based on automatic number identifier information delivered with the original inbound customer call, or may be another phone number provided to the customer management system by the inbound caller, e.g., during exercise of a call-back option 440.

The call-back list module 510 sends the phone number associated with call-back record to third party directory service module 520, illustratively the WhitePages® API. Service module 520 can provide additional caller identification information, such as name and address information, for terminated callers that are initially identified only by a telephone number, to add to the call-back record. The call-back record enriched by the service module is associated with an identified customer.

In an embodiment, an identified customer is a terminated inbound caller for which the customer management system has obtained reliable identifying data. This data is used by call-back management module method 500 to retrieve or identify additional data associated with that customer. In an embodiment, an identified customer is a customer for whom the system has reliably identified phone number, and at least two of name, address, and zip code.

The call-back record for the identified customer is then transmitted to module 530 for lookup of third party demographic data. In an embodiment, third party demographic database 530 is a customer demographic database maintained. The call-back record including data received at modules 520 and 530 is sent to Enriched Call-Back List module 540, which contains enriched call-back records for predictive modeling of value of identified customers, and for classifying callers for prioritized call-back.

Enriched call-back list data from module 540 is processed by the predictive model module 550 to determine a value prediction signal representing one or more of a likelihood that the identified customer will accept an offer to purchase a product, a likelihood that the identified customer will lapse in payments for a purchased product, and a likelihood that the identified customer will accept an offer to purchase the product and will not lapse in payments for the purchased product. The value prediction signal is used to classify identified customers in one of two or more value groups at module 560. This classification is used by outbound calling device 570 for prioritization of call-backs 580 to the classified customers.

Figure 6:
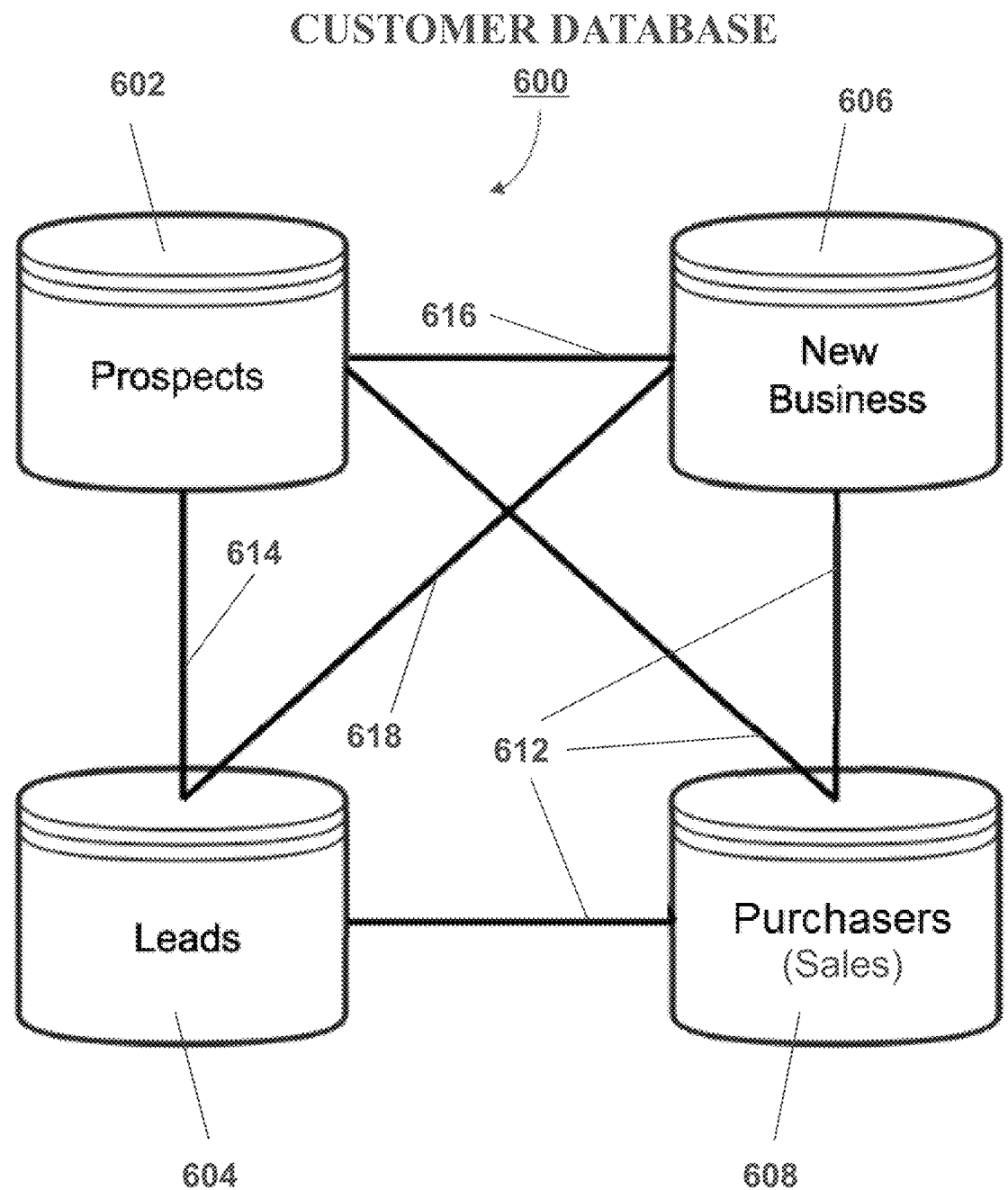
FIG. 6 is an architecture for a customer database including data stores for four target groups for marketing and customer acquisition of the enterprise, in accordance with an embodiment.

FIG. 6 is an architecture of a customer database 600, representing an embodiment of the customer database 122 of FIG. 1. Customer database 600 is an internal database of the sponsoring organization of the call center, or other enterprise. Customer database 600 stores information on individual customers of the enterprise, associating these customers with one or more of the groups Prospects 602, Leads 604, New Business 606 and Purchasers (Sales) 608. In the present disclosure, customer database records that identify individual customers of the enterprise, such as by name and phone number, are sometimes called "enterprise customer records." Customer database 600 includes links between each customer group and each of the other groups. These links between customer groups are sometimes herein called attributions. There are unique keys 612 between Purchasers (Sales) and each of the other data stores; a unique key 614 between Prospects 602 and Leads 604; a unique key 616 between Prospects 602 and New Business 606; and a unique key 618 between Leads 604 and New Business 606. In addition, customer database 600 tracks event data for customer-related activities, such as promotional activities, customer prospecting activities, and call center CRM activities. Customer database 600 joins customer information across these four groups, as well as attributions and events data, in order to better evaluate marketing and call center activities, build stronger models, and generate useful reports.

Customer database 600 employs attribution processes for tracking customers across events in customer acquisition and marketing. The objective of attribution is to track people across events: i.e., prospects, leads, applications, and sales. Customer database 600 uses exact matching of personal details in order to determine which prospects may have become leads, submitted new business applications, and/or bought products; and which leads may have submitted new business applications and/or bought products. In an embodiment, customer database 600 additionally employs matching algorithms for matching personal details with leads data retrieved from third party demographic databases.

Figure 7:
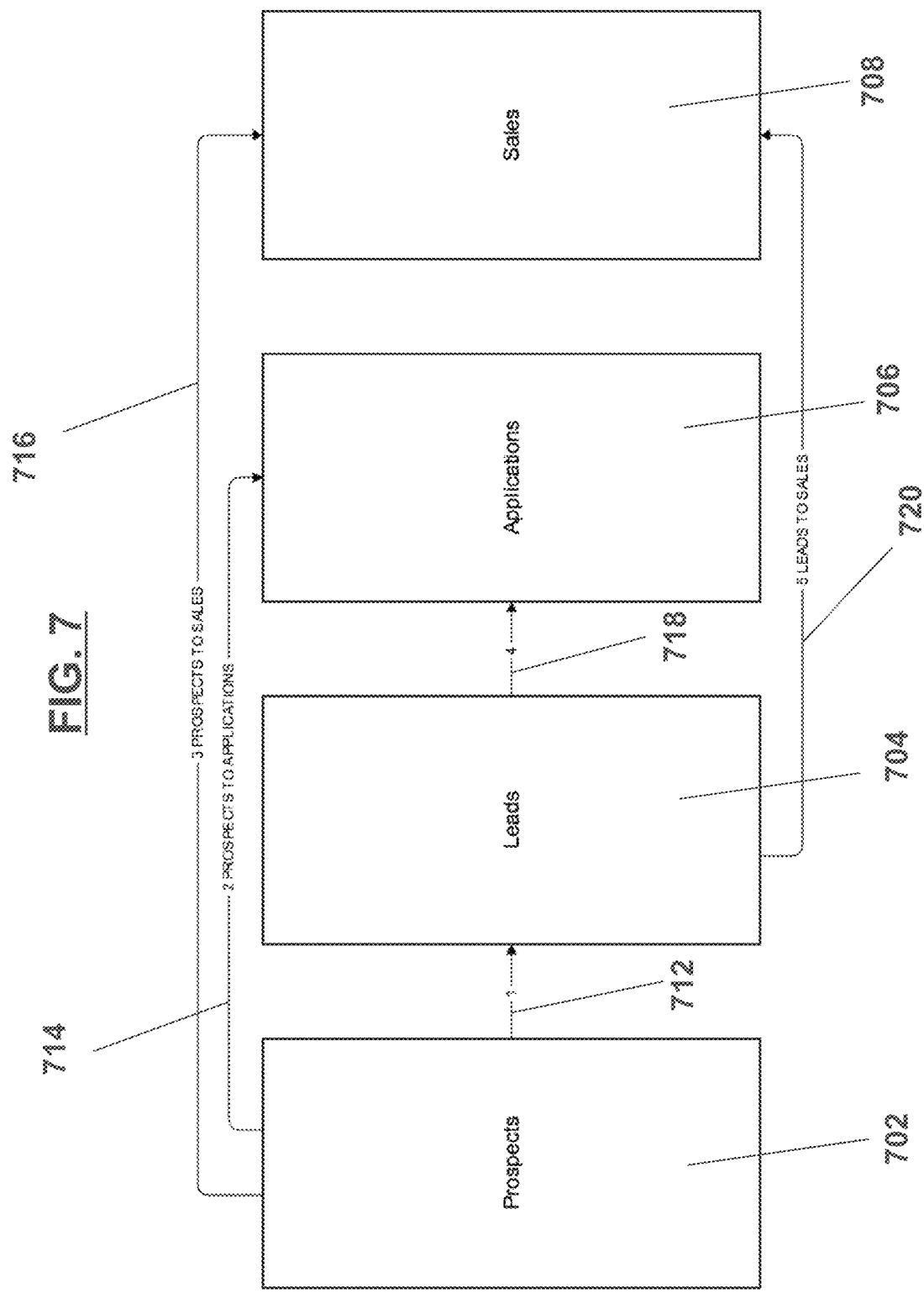
FIG. 7 is a flow chart diagram of attribution processes for tracking persons across events between customer groups (prospects, leads, new business applicants, and sales), in accordance with an embodiment.

The flow chart diagram of FIG. 7 shows attribution processes for tracking persons across events between the customer groups. FIG. 7 shows four customer groups, herein sometimes called "customer event" data: prospects 702, leads 704, applications 706, and sales 708. An individual customer can follow several different paths. For example, the customer might be a prospect who goes straight to a sale; might go through the leads pipeline; might submit an application but never buy the product, etc. Events also can include activity events, such as promotional activities, customer prospecting activities, and call center CRM activities.

In the present disclosure, customer database data tracking such activity events are sometimes called "activity event" data.

In an embodiment, events tracked by customer database 700 include pairs of events consisting of an event that occurs earlier in time (also herein called prior event; e.g., event A) and an event that occurs later in time (also herein called subsequent event; e.g., event B). Attributions, also called "attributions data" in the present disclosure, serve two primary functions. The first function is to trace all instances of a prior event A to see where these instances ended up. An example of this function is: "Find all leads, applications, and sales that resulted from prospecting activity on X date." The second function is to determine, for any record of a subsequent event B, which instance of event A most likely caused event B. An example of this function is: "Which prospecting activities were responsible for TERM product sales this month?"

Each arrow of FIG. 7 represents one of five attribution processes 712, 714, 716, 718, and 720. The illustrated embodiment does not include an attribution between applications and sales, because tracking between them is very simple. In another embodiment, the attributions would include an attribution between applications and sales. Each arrow is numbered (1, 2, 3, 4, or 5), representing the order in which these attribution processes are run. In an embodiment, each attribution process carries out the following steps, in order: (1) match records between event A and event B, where event B occurs later in time (e.g., in the prospect to leads attribution 712, prospect is event A and leads is event B); (2) filter matches based on a time limit determined by business rules; (3) determine the best match, i.e., the single record from event A that most likely led to each record from event B; and (4) load unique best matches to the attribution table, updating the historical table.

FIG. 8 is a schematic diagram of customer database event tables for the customer groups prospect, lead, new business, and sale, and of attribution tables between events. Customer database event tables pool all prospects, leads, applications, and sales across the enterprise into four standardized tables 852, 854, 856, 858. In an embodiment, prospect events data include, e.g., camp_cde (code of the marketing campaign that targeted the prospect) and marketing_date (earliest known date for the prospect). In an embodiment, leads events data include, e.g., lead_creation_date (earliest known date for the lead) and source_key (data that identifies the lead's corresponding prospect, where applicable). In an embodiment, new business events data include, e.g., role (role of the person in the record has on an insurance policy, such as owner, insured, or payer) and fyp (first year premium). In an embodiment, sale events data includes, e.g., policy_date (earliest known date for the policy) and vnb (value of new business).

In an embodiment of the system of FIG. 1, various data in customer database 122 are also stored in other internal databases 120 of the enterprise, such as call history database 124 and account information database 126. The latter databases may act as source systems for customer database 122. Referring again to FIG. 8, customer database records may have values in the columns source table, source_id_column, and source_id, indicating how to access information in the source system.

Attribution creates attribution tables by applying rules to the customer database event tables. The attribution tables 864, 868, 872, 876, and 882 of FIG. 8 provide the basic data representing the relationship between each pair of events 852, 854, 856, 858. In addition, the customer database 600 can build overall tables that aggregate all the relationships between prospect, lead, new business, and sales. For example, if a prospect is attributed to a lead, which in turn is attributed to a sale, an overall table would represent these relationships in a single row. In various embodiments, customer database builds reports via overall tables that apply analytics to select data using one or more of attribution tables 864, 868, 872, 876, and 882. In various embodiments, the analytics include criteria based on activity events.

In an example, the customer database 600 builds a report to answer the question: "What is the response rate for the Term to Perm campaign?" The customer database selects data using the marketing.datamart_prospect_lead_attrib table 864. The customer database applies analytics to focus on the Term to Perm marketing campaign, counting the number of leads generated from the total prospects. In another example, the customer database 600 builds a report to answer the question: "What is the conversion rate for the Retirement campaign?" The customer database selects data using the marketing.datamart_prospect_appl_attrib table 868. The customer database applies analytics to focus on the Retirement marketing campaign, counting the percentage of applications generated from the total prospects.

In an illustrative embodiment, customer management system 100 utilizes data from both internal and external sources in pre-sale predictive modeling of sale of a financial product (insurance policy). The data includes internal data 120 of the call center that tracks historical information about leads, customers, and marketing costs of the call center, including historical sales and lapse information. In an embodiment, these internal databases use rmm_analytics schema in data warehouse software. In an embodiment, internal databases 120 use rmm_analytics schema to generate a table of enterprise customer data. In another embodiment, internal databases 120 use rmm_analytics schema to generate additional data tables, such as a table of historical lead and customer data, and a table of marketing costs data.

In an embodiment, rmm_analytics schema includes sales and lapse data for current and/or historical leads of the enterprise, which data is used in building predictive models of the present disclosure. In an illustrative embodiment, a paid_flag indicates policy payments and a related field shows the amount of each payment. In the present disclosure, the data is called payment data. In an illustrative embodiment, either a lapse_flag or surrendered_flag indicate that a policy has lapsed. In the present disclosure, the data is called lapse data. In an embodiment, date fields are used for filtering data by date range. In an illustrative embodiment, information about leads, customers, and marketing costs was used to model a pre-determined period of time of payments following the sale of the product that defines lapse. In an illustrative embodiment, for the purpose of pre-sale predictive modeling of sale of an insurance policy, this modeling resulted in defining lapse as failure of the customer to maintain a purchased policy in force for at least 18 months.

In building the predictive models of the present disclosure, model datasets may have populations in the hundreds of thousands or millions of individuals. Model datasets may include training datasets and testing datasets. Filtering techniques can be applied to eliminate false data and for de duplicating, reducing the number of records but significantly improving quality of model datasets. In an illustrative embodiment, date-filtered data such as payment data and lapse data within an older date range are used for building a training data set, and date-filtered data within a more recent range are used for building a test data set. In an illustrative embodiment, predictive machine-learning models of the present disclosure are continually trained using updated payment data, lapse data, and customer demographic data.

In an embodiment, in building predictive models, rmm_analytics schema in VERTICA are filtered based on the flow of historical leads through the inbound call center routing process. In an embodiment, the data are filtered to select only historical leads that were connected to a live agent; in the present disclosure this flow is sometimes called a "warm transfer." Applicant has observed that building predictive models based on a population limited to warm transfers can improve performance of models for predicting sales and lapse behaviors.

In the illustrative embodiment, data used in predictive modeling also include data retrieved from the customer demographic database 132 to obtain information about customers. In an embodiment, customer demographic data includes individual level data on customers. In various embodiments, as a prerequisite to using data in predictive modeling of a given inbound caller (customer), analytical engine 104 associates the data with a customer identifier for the customer. In an illustrative embodiment, customer demographic data used in modeling of a customer requires an exact match of name and address.

In an embodiment, customer demographic data also includes data using zip-level features of the system, which provide a coarser representation in building the predictive model. Such zip-level features employ variables that have resolution at the zip-level for each individual in the zip code. In an illustrative embodiment, zip-level data for individual income is associated with a median value of income for each individual in the zip code. Reasons for using zip-level data in predictive modeling include, for example, lack of a statistically significant difference in model performance as a function of any polymr match score threshold; simplicity of collecting only the name and zip code in the telegreeter process; and privacy considerations as to individual-level data.

In various embodiments embodiment, in predictive modeling of inbound callers, inbound queue management system 102 uses a fast-lookup tool, such as polymr, that analyzes customer identifiers of inbound callers in real time to retrieve customer data, such as customer demographic data, matched to the customer identifiers. In an embodiment, the polymr fast-lookup tool is a lightweight, extensible search engine or API, implemented in the Python object-oriented programming language, https://www.python.org/. In various embodiments, the polymr tool performs real time matching of data in the customer demographic database 132 to a customer identifier for a given lead. In various embodiments, as a preliminary to using data in real-time predictive modeling of inbound callers, inbound queue management system 102 indexes the data by applying the search engine to customer identifiers in customer training data, and stores this index as an internal enterprise database 120.

In an embodiment, inbound/call-back management system 102 labels each data element as continuous (including interval), binary, ordinal, or nominal (categorical). For use in a logistic regression model 114, variables that have lookup fields are converted to integers. Following feature transformation of the variables, the final view outputs each variable with human-readable names (if known), and a tag at the end of the variable name. Illustrative end tags for transformed variable names include:

_binary: either 0 or 1
_ordinal_to_binary: either 0 or 1, where null values are mapped to 0
_flat_binary: mapped from a string field like "01001000" into multiple fields
_ordinal: as an integer, with null values left null
_interval: as an integer, with null values left null
_continuous: as an integer, with null values left null
_nominal: as an integer, with null values mapped to an additional integer By applying the feature transformation rules described above, analytical engine 104 builds a simplified input data file from data retrieved. This simplified input data file facilitates predictive modeling with a binary target.

Predictive modeling module 110 builds both a regression model 112 and a tree based model 116. In an embodiment, the predictive modeling module 110 trains a logistic regression model 112 with $l_1$ regularization on the full set of features of the Acxiom database. Use of logistic regression for classification problems provides performance advantages over standard linear regression, because application of the logistic function to the raw model score maps the output precisely from 0→1 while providing a smooth decision boundary. In an embodiment, the logistic regression model with $l_1$ regularization utilizes LASSO (Least Absolute Shrinkage and Selection Operator), a regression analysis method that performs both variable selection and regularization to enhance prediction accuracy and ease of interpretation of the resulting statistical model.

$l_1$ regularization provides the benefit of simplifying the selection of features through the model training process by constraining features with lower correlation to have 0 weight. The general form for a linear model can be indicated as:

$$\hat{y}(w,x) = w_o + w_1 x_1 + \ldots + w_p x_p$$

for $\hat{y}$ to be predicted from data points in the array x by learned coefficients w. The $l_1$ regularization is achieved by adding a term to the cost function, as follows:

$$\min_w \frac{1}{2n_{samples}} \|Xw - y\|_2^2 + a\|w\|_1$$

with regularization weight α. Applicant observed in training a logistic regression model with $l_1$ regularization, that run time of training increases rapidly with greater regularization parameters, with best model performance at low values of the regularization parameter a. In an embodiment, the logistic regression model with $l_1$ regularization sets the regularization parameter a using cross-validation, with best-performing values typically around 0.005-0.01.

In another embodiment, regression model employs logistic regression with l2 regularization, sometimes called ridge regression, according to the formula:

$$\min_w \frac{1}{2n_{samples}} \|Xw - y\|_2^2 + a\|w\|_2$$

In the $l_2$ regularization model, as in the $l_1$ regularization model, the regularization weight α is set by cross validation. In an embodiment, a logistic regression model with $l_2$ regularization uses a backward feature selection procedure to select an optimal number of features. This feature selection procedure is the RFECV method for recursive feature elimination in Scikit-learn. Scikit-learn is a software machine learning library for the Python programming language, available at https://github.com/scikit-learn/scikit-learn.

In various embodiments, both $l_1$ and $l_2$ regularization models fit a regularization hyperparameter using five folds for cross validation and searching across the seven parameters: [0, 0.001, 0.005, 0.01, 0.1, 0.5, 1]. In repeated iterations of model training, this range is restricted around previously successful settings.

In an embodiment, the tree based model 116 is a random forests model. Random forests is a class of ensemble methods used for classification problems. Random forests models work by fitting an ensemble of decision tree classifiers on sub samples of the data. Each tree only sees a portion of the data, drawing samples of equal size with replacement. Each tree can use only a limited number of features. By averaging the output of classification across the ensemble, the random forests model can limit over-fitting that might otherwise occur in a decision tree model.

In an embodiment, the tree-based model 116 uses the random forests model in Python's scikit-learn. In an illustrative embodiment, the tree-based model 116 uses the following parameters in the scikit-learn random forests model:

Maximum tree depth: 3 or ∞, set with max_depth.

Maximum number of features considered when looking for the best split: 3→6, set with max features.

Minimum number of samples required to split a node of the tree: 2→11, set with min_samples_split.

Minimum number of samples to be a leaf node: 1→11, set with min_samples_leaf.

Number of trees in the forest: 100 or 200, set by n_estimators.

Whether to sample with replacement for the data seen by each tree: true or false, set by bootstrap.

Function to measure quality of a split: Gini or Entropy (information gain), set as criterion.

In an embodiment, for each customer a pre-sale predictive model generates a value prediction signal indicative of potential value of a sales transaction for that customer. The predictive model can provide various types of value prediction signal including, for example: (a) buy-only signal, representative of the likelihood that the customer will accept the offer to purchase the product; (b) lapse-only signal representative of the likelihood that the customer will lapse in payments for the purchased product; (c) buy-don't-lapse signal representative of the likelihood that the customer will accept the offer to purchase the financial product and will not lapse in payments for the purchased product; as well as predictive models providing combinations of these signals.

Predictive models 110 effect a degree of feature selection. In various embodiments, predictive models 110 identify high importance features that have the most pronounced impact on predicted value. Different types of model may identify different features as most important. For example, a model based upon a buy-only signal may identify different leading features than a model based upon a lapse-only signal.

TABLE 1

Features from $l_1$ buy-don't-lapse model

| Importance | Feature |
|---|---|
| −2.7125 | expectant_parent_nominal |
| −0.3126 | recent_divorce_nominal_0 |
| −0.2634 | credit_card_new_issue_nominal_0 |
| −0.1438 | gender_input_individual_nominal_0 |
| 0.1117 | socially_influenced_ordinal |
| 0.0890 | home_length_of_residence_interval |
| −0.0757 | likely_investors_nominal_0 |
| −0.0667 | vacation_travel_international_would_enjoy_ordinal_to_binary |
| 0.0637 | total_liquid_investible_assets_fin_ordinal |
| −0.0632 | new_mover_nominal_0 |
| −0.0518 | single_parent_ordinal_to_binary |
| −0.0517 | vacation_travel_time_share_have_taken_ordinal_to_binary |
| −0.0455 | investments_real_estate_ordinal_to_binary |
| 0.0438 | investments_stocks_bonds_ordinal_to_binary |
| 0.0429 | obtain_life_insurance_along_with_loan_mortgage_installment_payments_ordinal |

Table 1 shows the top 15 features from an $l_1$ buy-don't-lapse model. The most important features are identified by the highest absolute value of the importance coefficient. The most important feature of this target is the expectant_parent_nominal variable, where a 0 corresponds to not expectant. Positive and negative signs of the importance coefficient indicate whether an increases, or a decrease, of the feature increases likelihood of the target. This data indicates that non-expectant parents are less likely to buy, and less likely to lapse.

Figure 9:
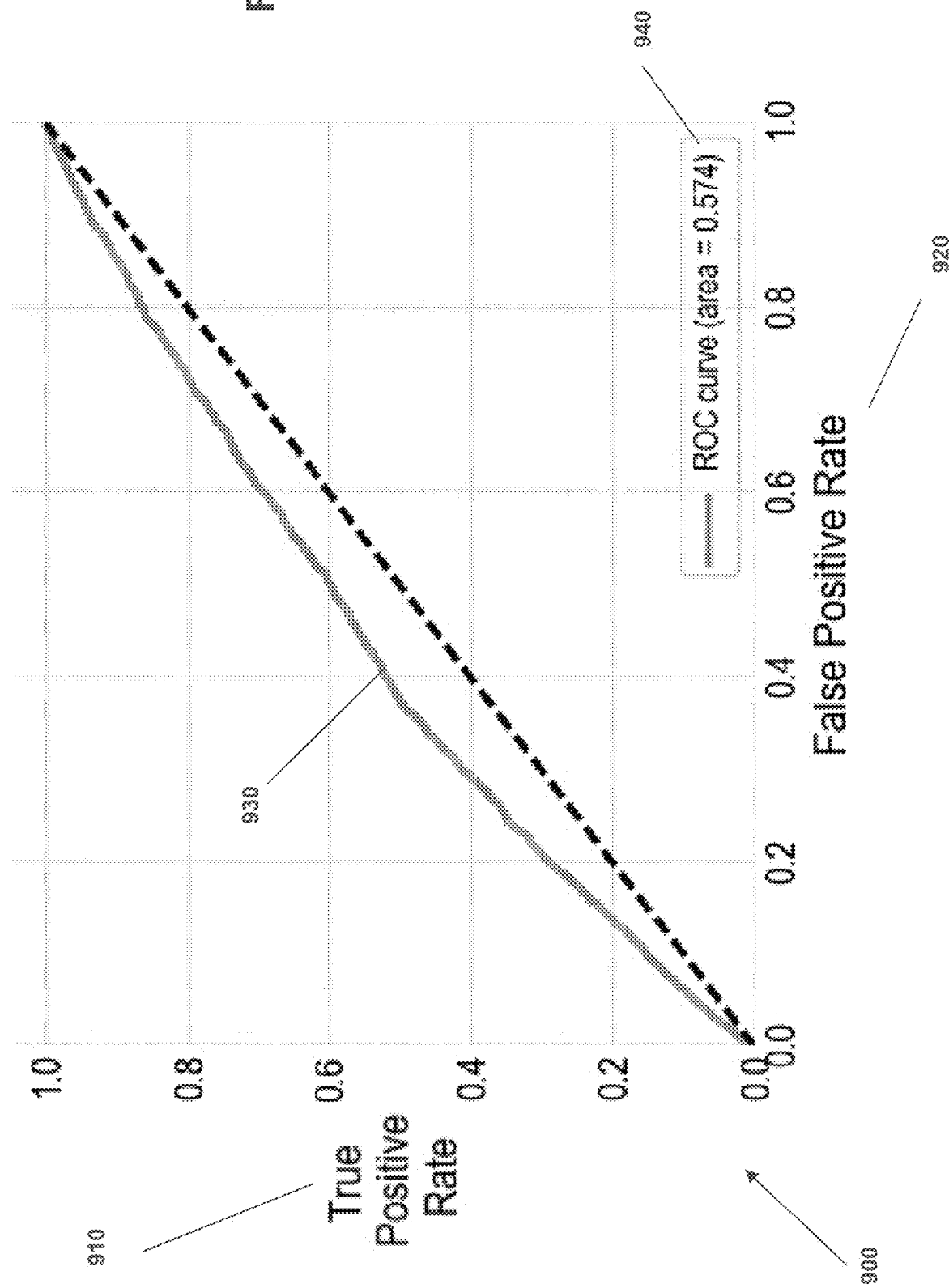
FIG. 9 is a graph of a receiver operator curve (ROC) for a value prediction model, in accordance with an embodiment.

In an embodiment, in building the predictive model 110, the call center evaluates performance of prospective models, such as test models, for efficacy in predicting buying behavior and/or lapse behavior. In an embodiment, prospective models are tested for the area under the curve (AUC) of a receiver-operator curve (ROC). FIG. 9 is an example 900 of an ROC curve 930. The receiver-operating characteristic (ROC) curve plots the true positive rate (Sensitivity) 910 as a function of the false positive rate (100-Specificity) 920 for different cut-off points. Each point on the ROC curve 930 represents a sensitivity/specificity pair corresponding to a particular decision threshold. An ROC curve with a higher area under the curve (AUC) generally indicates a higher-performing model. The ROC 900 of FIG. 9 was obtained in testing a logistic regression model with $l_1$ regularization on the lapse-only signal, and has an area under the curve (AUC) 940 of 0.574, indicating a high-performing model.

Figure 10:
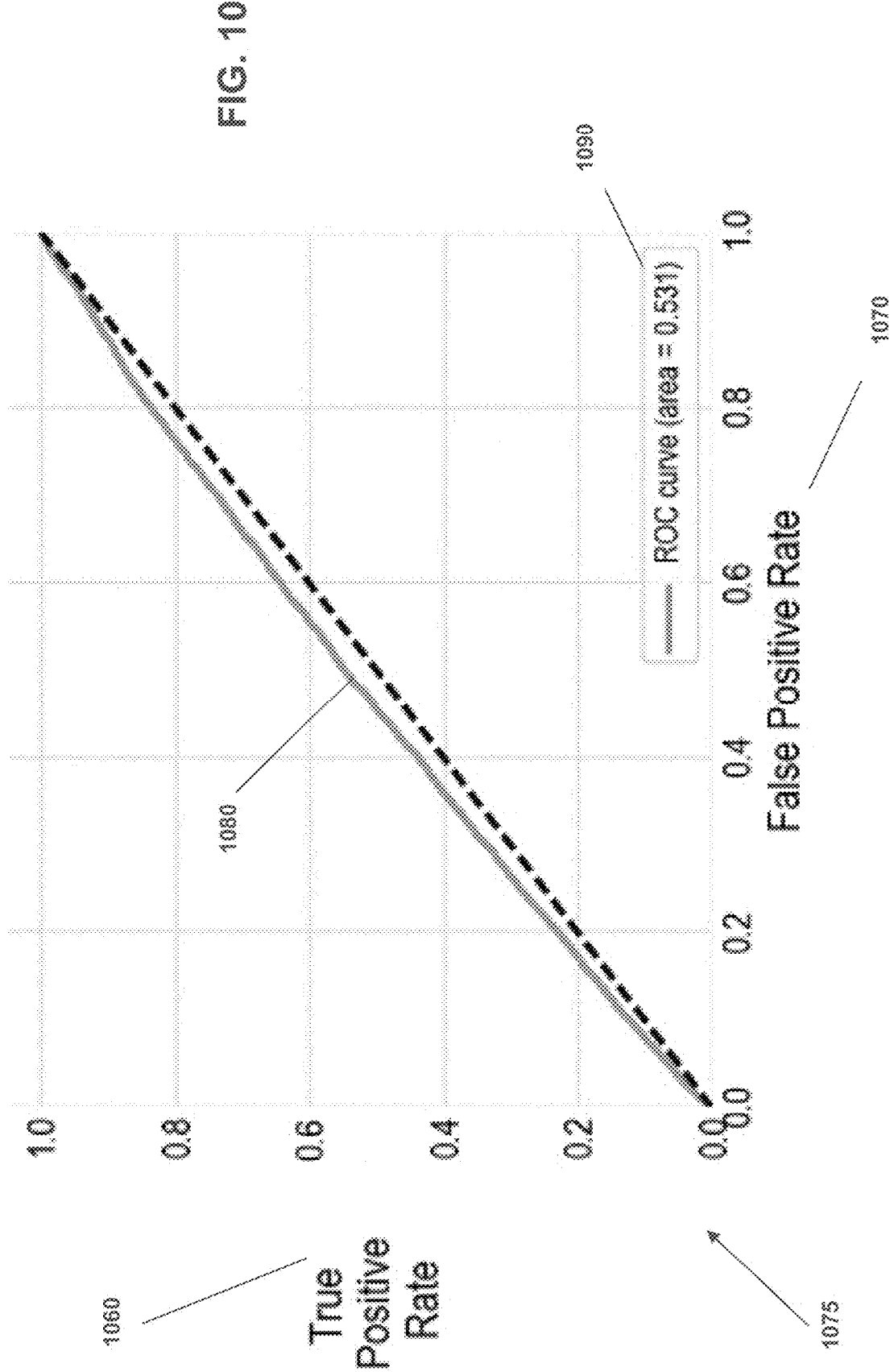
FIG. 10 is a graph of a receiver operator curve (ROC) for a value prediction model, in accordance with an embodiment.

FIG. 10 is another example of another receiver-operator curve (ROC) 1050, obtained by testing a logistic regression model with $l_2$ regularization on the buy-only signal trained using all leads. (Sensitivity) 1060 as a function of the false positive rate (100-Specificity) 1070 for different cut-off points. Each point on the ROC curve 1080 represents a sensitivity/specificity pair corresponding to a particular decision threshold. (ROC) 1050 has an area under the curve (AUC) 1090 of 0.531.

Figure 11:
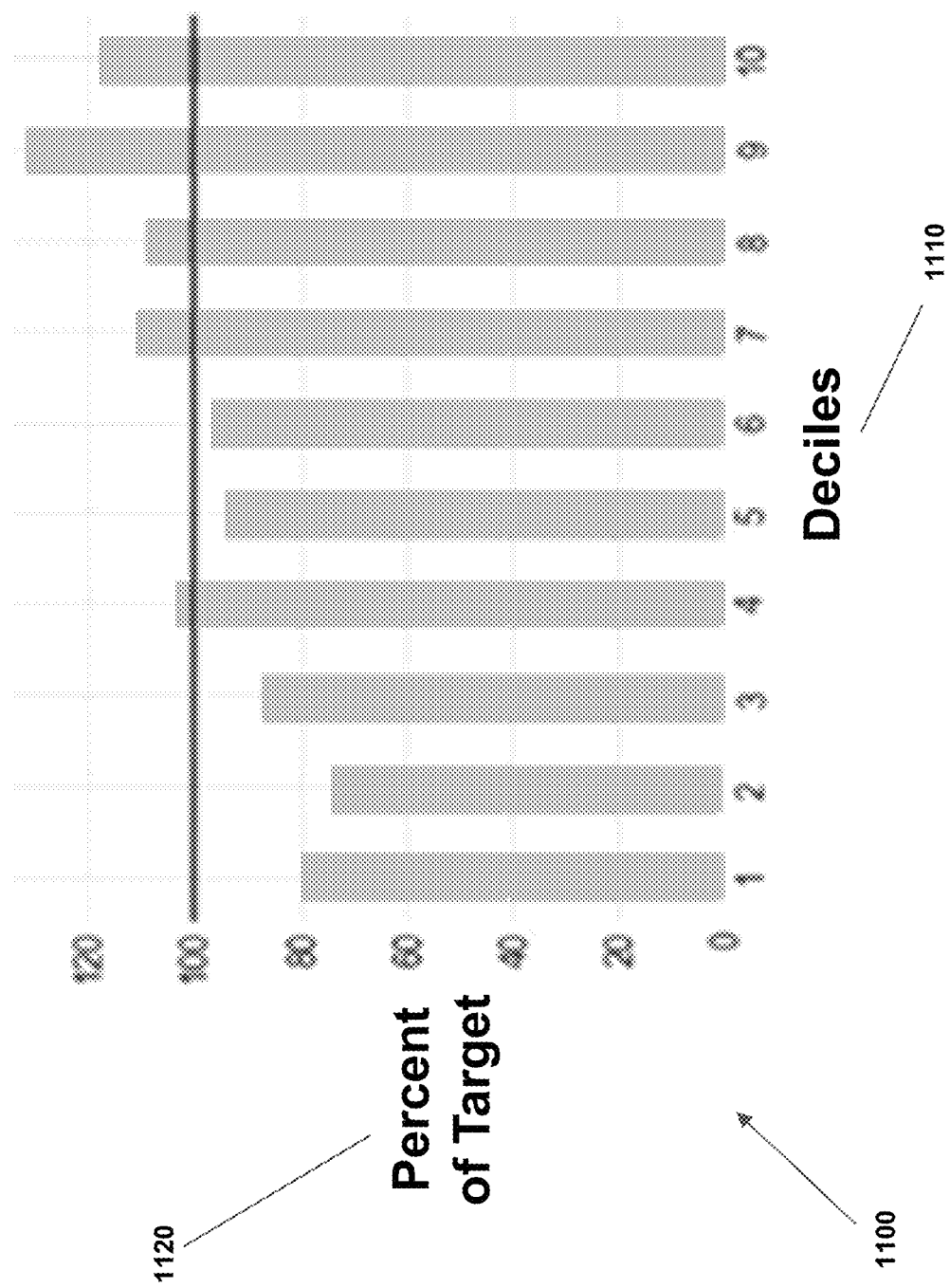
FIG. 11 is a graph of lift across deciles of model scores for a value prediction model, in accordance with an embodiment.

In an embodiment, prospective predictive models are tested for performance by measuring lift across deciles. Lift is a measure of the degree of improvement of a predictive model over analysis without a model. For a binary classifier model, decile lift is applied to deciles of the target records ranked by predicted probability. FIG. 11 is a graph of lift across deciles of model scores 600 for a logistic regression model with $l_1$ regularization on the lapse-only signal, trained on zip-level features. Percent of target values 1120 across deciles 1110 show a significant impact of the model on lapse rate.

In an embodiment, prospective predictive models are tested for performance by measuring improvements in buying behavior and/or reductions on lapse rate. In various embodiments, these measurements are carried out with different levels of resource constraint of the call center, measured by call center agent resources in view of inbound call volume. For example, a 70% resource constraint involves agent resources at a 70% level of resources in view of call volume relative to full resources.

In illustrative embodiments, the predictive model incorporated a logistic regression model with $l_1$ regularization, for the lapse-only target. In one illustrative embodiment, this model was trained on all customers with individual-level data. In another illustrative embodiment, this model was trained on all customers with zip-level data. At a 70% resource constraint, the model with individual-level data was tested to provide an 11% reduction in lapse rate, while the model with zip-level data was tested to provide an 8% reduction in lapse rate. At a 60% resource constraint, the model with individual-level data was tested to provide a 14% reduction in lapse rate, while the model with zip-level data was tested to provide an 11% reduction in lapse rate.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof.

A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A processor based method for managing customer calls within a call center, comprising:
    in response to receiving a customer call from an identified customer at an inbound call receiving device,
        opening, by a processor, an inbound call record for the customer call;
        monitoring, by the processor, the customer call of the identified customer to detect any termination of the customer call;
    in an event of detecting the termination of the customer call, executing, by the processor, a predictive machine-learning model to determine a value prediction signal representative of a value of the identified customer of the inbound call record, the predictive machine-learning model classifying the identified customer into a first value group or a second value group, wherein the predictive machine-learning model is trained by inputting payment data, marketing costs data, or lapse data; and in response to the predictive machine-learning model classifying the identified customer into the first value group, automatically calling back the identified customer.

2. The processor based method of claim 1, further comprising:

updating, by the processor, the inbound call record with any interaction data received from the identified customer.

3. The processor based method of claim 2, wherein the interaction data corresponds to an interactive voice response (IVR) and is received via interaction of the identified customer with an IVR unit.

4. The processor based method of claim 1, wherein the monitoring the customer call to detect any termination of the customer call comprises monitoring the identified customer's presence in an inbound queue to detect the identified customer's abandoning the customer call.

5. The processor based method of claim 1, wherein the value prediction signal is representative of a modeled lifetime value of the identified customer.

6. The processor based method according to claim 1, wherein the value prediction signal is representative of a likelihood of sale of a product to the identified customer.

7. The processor based method of claim 1, wherein the predictive machine-learning model is continually trained by inputting customer demographic data.

8. A system for managing customer calls, comprising:
an inbound telephone call receiving device for receiving a customer call from an identified customer;
a telephone calling device for placing outbound customer calls;
at least one processor configured to:
in response to receiving the customer call from the identified customer at an inbound call receiving device,
open an inbound call record for the customer call;
monitor the customer call of the identified customer to detect any termination of the customer call;
in an event of detecting the termination of the customer call, execute a predictive machine-learning model to determine a value prediction signal representative of a value of the identified customer of the inbound call record, the predictive machine-learning model classifying the identified customer into a first value group or a second value group, wherein the predictive machine-learning model is trained by inputting payment data, marketing costs data, or lapse data; and
in response to the predictive machine-learning model classifying the identified customer into the first value group, automatically call back the identified customer.

9. The system of claim 8, wherein the at least one processor is further configured to:
update the inbound call record with any interaction data received from the identified customer.

10. The system of claim 9, wherein the interaction data corresponds to an interactive voice response (IVR) and is received via interaction of the identified customer with an IVR unit.

11. The system of claim 8, wherein the monitoring the customer call to detect any termination of the customer call comprises monitoring the identified customer's presence in an inbound queue to detect the identified customer's abandoning the customer call.

12. The system of claim 8, wherein the value prediction signal is representative of a modeled lifetime value of the identified customer.

13. The system according to claim 8, wherein the value prediction signal is representative of a likelihood of sale of a product to the identified customer.

14. The system of claim 8, wherein the predictive machine-learning model is continually trained by inputting customer demographic data.

15. A non-transitory machine-readable storage medium having computer-executable instructions stored thereon that, when executed by one or more processors, cause the one or more processors to perform operations comprising:
in response to receiving a customer call from an identified customer at an inbound call receiving device,
open an inbound call record for the customer call;
monitor the customer call of the identified customer to detect any termination of the customer call;
in an event of detecting the termination of the customer call, execute a predictive machine-learning model to determine a value prediction signal representative of a value of the identified customer of the inbound call record, the predictive machine-learning model classifying the identified customer into a first value group or a second value group, wherein the predictive machine-learning model is trained by inputting payment data, marketing costs data, or lapse data; and
in response to the predictive machine-learning model classifying the identified customer into the first value group, automatically call back the identified customer.

16. The non-transitory machine-readable storage medium of claim 15, wherein the instruction cause the one or more processors to:
update the inbound call record with any interaction data received from the identified customer.

17. The non-transitory machine-readable storage medium of claim 16, wherein the interaction data corresponds to an interactive voice response (IVR) and is received via interaction of the identified customer with an IVR unit.

18. The non-transitory machine-readable storage medium of claim 15, wherein the monitoring the customer call to detect any termination of the customer call comprises monitoring the identified customer's presence in an inbound queue to detect the identified customer's abandoning the customer call.

* * * * *